(12) United States Patent
Byrne et al.

(10) Patent No.: US 11,651,226 B2
(45) Date of Patent: May 16, 2023

(54) SYSTEM HAVING MULTIPLE PROCESSING UNIT SETS FOR TRAINING NEURAL NETWORKS

(71) Applicant: Graphcore Limited, Bristol (GB)

(72) Inventors: Helen Byrne, Bristol (GB); Luke Benjamin Hudlass-Galley, Bristol (GB); Carlo Luschi, Bristol (GB)

(73) Assignee: GRAPHCORE LIMITED, Bristol (GB)

( * ) Notice: Subject to any disclaimer, the term of this patent is extended or adjusted under 35 U.S.C. 154(b) by 586 days.

(21) Appl. No.: 16/788,918

(22) Filed: Feb. 12, 2020

(65) Prior Publication Data

US 2021/0241093 A1   Aug. 5, 2021

Related U.S. Application Data

(63) Continuation-in-part of application No. 16/777,353, filed on Jan. 30, 2020.

(51) Int. Cl.
*G06F 30/13* (2020.01)
*G06N 3/08* (2023.01)
(Continued)

(52) U.S. Cl.
CPC ............. *G06N 3/08* (2013.01); *G06K 9/6215* (2013.01); *G06K 9/6256* (2013.01); *G06N 3/02* (2013.01); *G06N 3/06* (2013.01); *G06N 7/00* (2013.01)

(58) Field of Classification Search
CPC .. G06N 3/08; G06N 3/04; G06N 3/10; G06N 3/06; G06N 3/02; G06N 7/00; G06K 9/6215; G06K 9/6256
(Continued)

(56) References Cited

U.S. PATENT DOCUMENTS

2020/0364545 A1\* 11/2020 Shattil .................. G06N 3/08

FOREIGN PATENT DOCUMENTS

WO   WO-2016037351 A1 \*  3/2016   ............... G06N 3/04
WO   WO-2020037055 A1 \*  2/2020   ........... E06B 3/6722

OTHER PUBLICATIONS

Farber et al. et al. (Parallel Neural Network Training On Multi-Spert, (8 pages)). (Year: 1999).\*
(Continued)

*Primary Examiner* — Andre Pierre Louis
(74) *Attorney, Agent, or Firm* — Haynes and Boone, LLP

(57) ABSTRACT

A data processing system for training a neural network, the data processing system comprising: a first set of one or more processing units running one model of the neural network, a second set of one or more processing units running another model of the neural network, a data storage, and an interconnect between the first set of one or more processing units, the second set of processing units and the data storage, wherein the data storage is configured to provide over the interconnect, training data to the first set of one or more processing units and the second set of one more processing units, wherein each of the first and second set of processing units is configured to, when performing the training, evaluate loss for the respective training iteration including a measure of the dissimilarity between the output values calculated based on the different modes running on the first and second set of processing units, wherein the dissimilarity measure is weighted in the evaluation of the loss in accordance with a parameter that is updated between different training iterations.

30 Claims, 15 Drawing Sheets

(51) Int. Cl.
*G06K 9/62* (2022.01)
*G06N 3/02* (2006.01)
*G06N 3/06* (2006.01)
*G06N 7/00* (2023.01)

(58) Field of Classification Search
USPC .......................................................... 706/25
See application file for complete search history.

(56) References Cited

OTHER PUBLICATIONS

Hegde et al. (Parallel and Distributed Deep Learning, 8 pages. (Year: 2016).*
Nounagnon (Using Kullback-Leibler Divergence to Analyze the Performance of Collaborative Positioning, 169 pages). (Year: 2016).*
Anil et al., "Large Scale Distributed Neural Network Training Through Online Distillation", arxiv:1804.03235v1 [cs.LLG] Apr. 9, 2018.
Baydin, et al., "Online Learning Rate Adaptation with Hypergradient Descent", ICLR, Feb. 26, 2018.
Bottou, et al., "Optimization Methods for Large-Scale Machine Learning", arXiv:1606.048383v3 {stat.ML], Feb. 12, 2018.
Duchi, et al., "Adaptive Subgradient Methods for Online Learning and Stochastic Optimization", Journal of Machine Learning Research. 2011.
Goodfellow, Deep Learning, The MIT Press, 2016, ISBN 0262035618.
"Genetic Programming and Evolvable Machines", Oct. 2017.
Hinton, et al., "Distilling the Knowledge in a Neural Network", arXiv:1503.02531v1, Mar. 9, 2015.
Kingma, et al., "A Method for Stochastic Optimization", ICLR 2015.
Rubio, "Convergence Analysis of an Adaptive Method of Gradient Descent", University of Oxford, 2017.
Sutskever, "On the Importance of initialization and Momentum in Deep Learning", Proceedings of the 30th International Conference on Machine Learning, Atlanta, GA USA, JMLR: W&CP vol. 28, 2013.
Hinton, "Neural Networks for Machine Learning".
Zhang, et al., "Deep Mutual Learning", Dalian University of Technology, China. Jun. 2017.

* cited by examiner

SYSTEM HAVING MULTIPLE PROCESSING UNIT SETS FOR TRAINING NEURAL NETWORKS

CROSS REFERENCE TO RELATED APPLICATIONS

The present application is a Continuation-In-Part of U.S. patent application Ser. No. 16/777,353, filed on Jan. 30, 2020, the disclosure of which is incorporated by reference herein in its entirety.

TECHNICAL FIELD

The present disclosure relates to a data processing system comprising multiple sets of processing units and, in particular, to techniques that adapt the training of neural networks for such a system.

BACKGROUND

Neural networks are used in the field of machine learning and artificial intelligence. Neural networks comprise arrangements of sets of nodes which are interconnected by links and which interact with each other. The principles of neural networks in computing are based on information about how electrical stimuli convey information in the human brain. For this reason, the nodes are often referred to as neurons. They may also be referred to as vertices. The links are sometimes referred to as edges. The network can take input data and certain nodes perform operations on the data. The result of these operations is passed to other nodes. The output of each node is referred to as its activation or node value. Each link is associated with a weight. A weight defines the connectivity between nodes of the neural network. Many different techniques are known by which neural networks are capable of learning, which takes place by altering values of the weights to reproduce a target or label.

FIG. 1 shows an extremely simplified version of one arrangement of nodes in a neural network. This type of arrangement is often used in learning or training and comprises an input layer of nodes, a hidden layer of nodes and an output layer of nodes. In reality, there will be many nodes in each layer, and often more than one hidden layer. Networks may have millions of nodes and be connected multi-dimensionally. Each node of the input layer Ni is capable of producing at its output, an activation or node value which is generated by carrying out a function on data provided to that node. Each of the weights defines the connectivity of a particular node with a connected node in the hidden layer. A vector of node values output from the input layer is scaled by a matrix of respective weights to provide a set of input values for the nodes in the hidden layer. The weights applied to determine the inputs of the node $N_h$ are labelled $w_0 \ldots w_2$. After the matrix of weights is applied to the outputs of one layer, to determine the weighted incoming data for the next layer, each node in the next layer performs an activation function on the weighted incoming data. The activation function can be, for example, a sigmoid. See FIG. 1A. Each node in the input layer is connected, at least initially, to each node in the hidden layer. Each node in the hidden layer can perform an activation function on the data which is provided to it and can generate similarly an output vector which, after applying another matrix of weights, is supplied to each of the nodes $N_0$ in the output layer. The nodes $N_o$ in the output layer then apply an activation function to the incoming weighted data to determine the output values for the network.

There are different learning approaches, but in each case there is a forward propagation through the network from left to right in FIG. 1, a calculation of overall loss, and a backward propagation from right to left in FIG. 1 through the network of the loss. In the next cycle, each node takes into account the back propagated loss and produces a revised set of weights. In this way, the network can be trained to perform its desired operation. In addition to updating the weights, other model parameters, such as the biases that are applied at each of the nodes to calculate the activations, may also be updated as part of the learning process.

In order to determine the magnitude and direction of the updates that are applied to each of the model parameters in the network, a loss function is evaluated. Updates to the model parameters are made to attempt to minimise the loss function. The loss function represents the difference between the output of a neural network and the target defined in the training data for the neural network. The loss function ($L_s$) calculated for sets of training data is used to update the model parameters, θ. In some cases, the loss function may be calculated to perform updating of the model parameters for each sample of input data to the neural network. However, typically the training data will be divided into mini-batches with the loss function being calculated once for each mini-batch. Learning is based on backpropagation of the gradient of the loss function with respect to the model parameters. At iteration k, the updated model parameters for the next training iteration, k+1, are calculated:

$$\theta_{k+1} = \theta_k - \eta_k \nabla_\theta L_s(\theta_k) \qquad \text{Equation 1}$$

where $\eta_k$ is the learning rate for training iteration k. $\nabla_\theta L_s(\theta_k)$ is the gradient of the loss function with respect to the model parameters or, in the case of mini-batch Stochastic Gradient Descent, is the average such gradient across the mini-batch.

Different types of loss function to be minimised are known. For example, one type of loss function corresponds to the sum of the squares of the differences between the output values and the target values. Another type of loss function, which may be used for classification problems, is given by the cross-entropy:

$$L_s(\theta_k) = \chi_{ent} = -\sum_{x \in \chi} y(x) \log p(x) \qquad \text{Equation 2}$$

where p(x) is the model's output probability (also referred to as a prediction) of the class being correct. p(x) is derived from the output of the xth node in the output layer of the neural network, and y(x) is the corresponding target value (also referred to as a label) for the class.

New types of data processing systems are being designed that are specifically adapted for the training of neural networks. Such data processing systems make use of a very large number of processors that are capable of performing massively parallel processing that can be applied for training neural networks. Such data processing systems may make use of sets of processing units provided, for example, in clusters. Each of the processing units may itself contain a plurality of processors. The Graphcore Intelligence Processing Unit (IPU) is an example of such a processing unit.

SUMMARY

When training neural networks, it is important to consider how to optimise the training to make use of the parallel processing that is provided by a data processing system having multiple sets of processing units. These multiple set of processing units enable the training of neural networks to be performed in a distributed fashion.

According to a first aspect, there is provided a data processing system for training a neural network, the data processing system comprising: a first set of one or more processing units, a second set of one or more processing units, at least one data storage, and at least one interconnect between the first set of one or more processing units, the second set of processing units and the at least one data storage, wherein the first set of one or more processing units is configured to run a first model of the neural network and the second set of one or more processing units is configured to run a second model of the neural network, wherein the at least one data storage is configured to provide over the at least one interconnect, training data to the first set of one or more processing units and the second set of one more processing units, wherein each of the first and second set of processing units is configured to, for each of at least some of a plurality of training iterations for training the neural network: perform a series of operations on at least part of the training data to calculate output values for the model of the neural network running on the respective set of processing units; exchange over the at least one interconnect, with the other of the first and second set of processing units, data indicating a state of each of the models running on each of the sets of processing units; determine based on the received data indicating the state, a set of output values calculated for the model of the neural network running on the other set of processing units; evaluate a loss function for the respective training iteration, said loss function including a measure of dissimilarity between the output values calculated for the model of the neural network running on the respective set of processing units and the determined set of output values for the model of the neural network running on the other set of processing units, wherein the measure of dissimilarity is weighted in the evaluation of the loss function in accordance with a parameter; update model parameters of the neural network using the respective evaluated loss function; and update the parameter for use in subsequent ones of the training iterations.

The different sets of processing units are configured to each train a model, but do so by exchanging data indicating state of their models for each training iteration. The exchange of this data enables each of the sets of processing units to determine predictions for the model running on the other set of processing units, and to use the predictions of the other model to each update their own model. This effect is optimised by introducing a parameter (referred to as 'the hyperparameter' in the following description) that changes over the course of training to control how much the dissimilarity of the predictions between models impacts the updates to the model parameters.

In some embodiments, the data indicating the state of each of the models running on the other of the sets of processing units comprises the determined set of output values, wherein the step of determining based on the received data indicating the state, the set of output values, comprises extracting those output values from the received data indicating the state.

In some embodiments, the data indicating the state of each of the models running on the other of the sets of processing units comprises model parameters of the model running on the other of the sets of processing units, wherein the step of determining the set of output values comprises calculating those values using the received model parameters.

In some embodiments, the training data provided by the at least one data storage over the interconnect comprises a same set of training data provided to the first set of one or more processing units and the second set of one or more processing units.

In some embodiments, the providing training data to the first set of one or more processing units and the second set of one more processing units comprises providing different sets of training data to the first set of one or more processing units and the second set of one or more processing units.

In some embodiments, the data indicating the state of each of the models running on the other of the sets of processing units comprises the determined set of output values, wherein at least one of the sets of processing units is configured to: receive over the at least one interconnect from the other of the set of processing units, at least part of the training data received from the at least one data storage by the other of the sets of processing units; and perform the calculating output values for the model of the neural network running on the respective set of processing units using the at least part of the training data received from the other of the set of processing units.

In some embodiments, each of the first set of one or more processing units and the second set of one or more processing units comprises a cluster of processing units, each of the processing units being formed as part of a separate integrated circuit.

In some embodiments, the updating of the parameter comprises at least one of the first and second set of processing units receiving an updated value for the parameter.

In some embodiments, the updating the parameter comprises at least one of the first and second set of processing units updating a value of the parameter to one of a set of values predefined before the training of the neural network.

In some embodiments, the updating the parameter is performed in dependence upon a learning rate for the neural network.

In some embodiments, at least one of the first and second set of processing units is configured to calculate the updated parameter in dependence upon values calculated in dependence upon the training data and model parameters used for the respective training iteration.

In some embodiments, the values calculated in dependence upon the training data comprise at least one: the loss function; one or more gradients of the loss function; and a learning rate for the previous training iteration.

In some embodiments, the calculating the updated parameter comprises calculating the updated parameter in dependence upon a moving average using previously determined parameter values for a plurality of previous training iterations.

In some embodiments, the moving average is an exponential moving average.

In some embodiments, each of the processing units of the first and second sets of processing unit is configured to alternate between operating in: a compute phase in which the respective processing unit performs calculations for training the neural network; and an exchange phase in which data for training the neural network is exchanged with others of the processing units, said data for training the neural network including the data indicating the state of each of the models, wherein the step of exchanging, over the at least one interconnect, the data indicating the state is performed during one of the exchange phases.

In some embodiments, the measure of the dissimilarity comprises the Kullback-Leibler divergence between the output values calculated for the model of the neural network running on the respective set of processing units and the determined set of output values for the model of the neural network running on the other set of processing units.

In some embodiments, the measure of the dissimilarity comprises the mean squared error between the output values calculated for the model of the neural network running on the respective set of processing units and the determined set of output values for the model of the neural network running on the other set of processing units.

In some embodiments, the data processing system comprises a host system comprising at least one processor configured to: interface the first and second set of processing units with the at least one data storage; and provide the training data to the first and second set of processing units from the at least one data storage.

According to a second aspect, there is provided a method for training a neural network, the method implemented in a data processing system comprising: a first set of one or more processing units, a second set of one or more processing units, at least one data storage, and at least one interconnect between the first set of one or more processing units, the second set of processing units and the at least one data storage, wherein the first set of one or more processing units is configured to run a first model of the neural network and the second set of one or more processing units is configured to run a second model of the neural network, wherein the method comprises: performing a series of operations on at least part of the training data to calculate output values for the model of the neural network running on the respective set of processing units; exchanging over the at least one interconnect, with the other of the first and second set of processing units, data indicating a state of each of the models running on each of the sets of processing units; determining based on the received data indicating the state, a set of output values calculated for the model of the neural network running on the other set of processing units; evaluating a loss function for the respective training iteration, said loss function including a measure of dissimilarity between the output values calculated for the model of the neural network running on the respective set of processing units and the determined set of output values for the model of the neural network running on the other set of processing units, wherein the measure of dissimilarity is weighted in the evaluation of the loss function in accordance with a parameter; updating model parameters of the neural network using the respective evaluated loss function; and updating the parameter for use in subsequent ones of the training iterations.

In some embodiments, the data indicating the state of each of the models running on the other of the sets of processing units comprises the determined set of output values, wherein the step of determining based on the received data indicating the state, the set of output values, comprises extracting those output values from the received data indicating the state.

In some embodiments, the data indicating the state of each of the models running on the other of the sets of processing units comprises model parameters of the model running on the other of the sets of processing units, wherein the step of determining the set of output values comprises calculating those values using the received model parameters.

In some embodiments, the training data provided by the at least one data storage over the interconnect comprises a same set of training data provided to the first set of one or more processing units and the second set of one or more processing units.

In some embodiments, the providing training data to the first set of one or more processing units and the second set of one more processing units comprises providing different sets of training data to the first set of one or more processing units and the second set of one or more processing units.

In some embodiments, the data indicating the state of each of the models running on the other of the sets of processing units comprises the determined set of output values, wherein the method comprises, at least one of the sets of processing units: receiving over the at least one interconnect from the other of the set of processing units, at least part of the training data received from the at least one data storage by the other of the sets of processing units; and performing the calculating output values for the model of the neural network running on the respective set of processing units using the at least part of the training data received from the other of the set of processing units.

In some embodiments, each of the first set of one or more processing units and the second set of one or more processing units comprises a cluster of processing units, each of the processing units being formed as part of a separate integrated circuit.

In some embodiments, the updating of the parameter comprises at least one of the first and second set of processing units receiving an updated value for the parameter.

In some embodiments, the updating the parameter comprises at least one of the first and second set of processing units updating a value of the parameter to one of a set of values predefined before the training of the neural network.

In some embodiments, the updating the parameter is performed in dependence upon a learning rate for the neural network.

In some embodiments, the method comprises, at least one of the first and second set of processing units calculating the updated parameter in dependence upon values calculated in dependence upon the training data and model parameters used for the respective training iteration.

In some embodiments, the values calculated in dependence upon the training data comprise at least one: the loss function; one or more gradients of the loss function; and a learning rate for the previous training iteration.

In some embodiments, the calculating the updated parameter comprises calculating the updated parameter in dependence upon a moving average using previously determined parameter values for a plurality of previous training iterations.

In some embodiments, the moving average is an exponential moving average.

In some embodiments, the method comprises, each of the processing units of the first and second sets of processing unit, alternating between operating in: a compute phase in which the respective processing unit performs calculations for training the neural network; and an exchange phase in which data for training the neural network is exchanged with others of the processing units, said data for training the neural network including the data indicating the state of each of the models, wherein the step of exchanging, over the at least one interconnect, the data indicating the state is performed during one of the exchange phases.

In some embodiments, the measure of the dissimilarity comprises the Kullback-Leibler divergence between the output values calculated for the model of the neural network running on the respective set of processing units and the determined set of output values for the model of the neural network running on the other set of processing units.

In some embodiments, the measure of the dissimilarity comprises the mean squared error between the output values calculated for the model of the neural network running on the respective set of processing units and the determined set of output values for the model of the neural network running on the other set of processing units.

In some embodiments, the data processing system comprises a host system, the method comprising, the host system, interfacing the first and second set of processing units with the at least one data storage; and providing the training data to the first and second set of processing units from the at least one data storage.

BRIEF DESCRIPTION OF THE DRAWINGS

For a better understanding of the present invention and to show how the same may be carried into effect, reference will now be made by way of example to the accompanying Figures in which.

DETAILED DESCRIPTION

Embodiments make use of sets of data processing units. Each data processing unit in a set of processing units may be a multi-tile processing unit comprises a plurality of processors.

Figure 1:
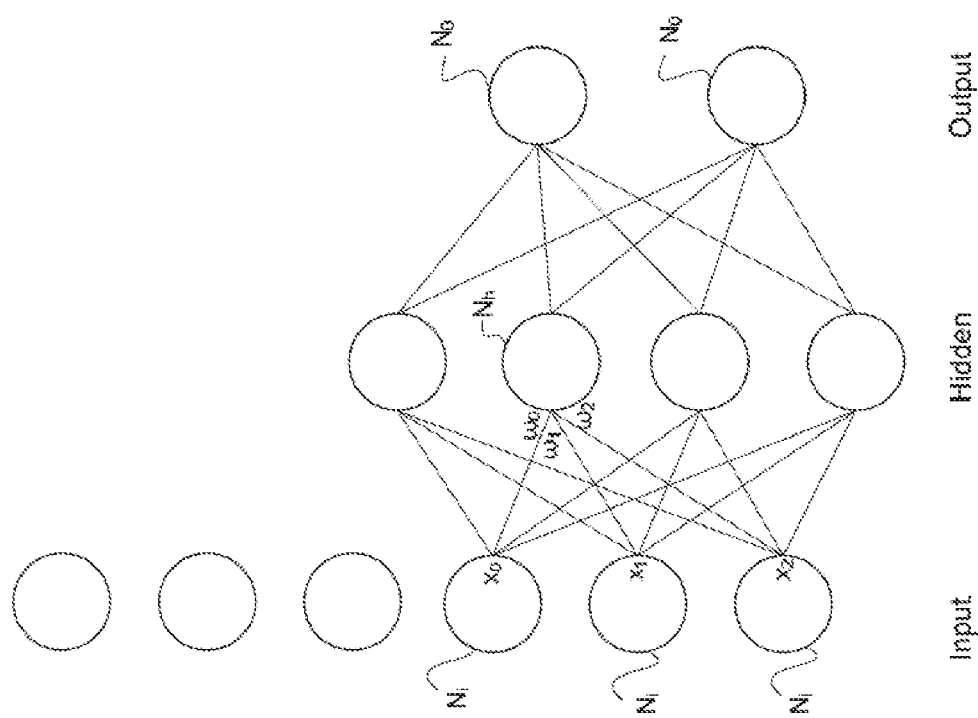
FIG. 1 is a highly simplified schematic view of a neural net.
Figure 1A:
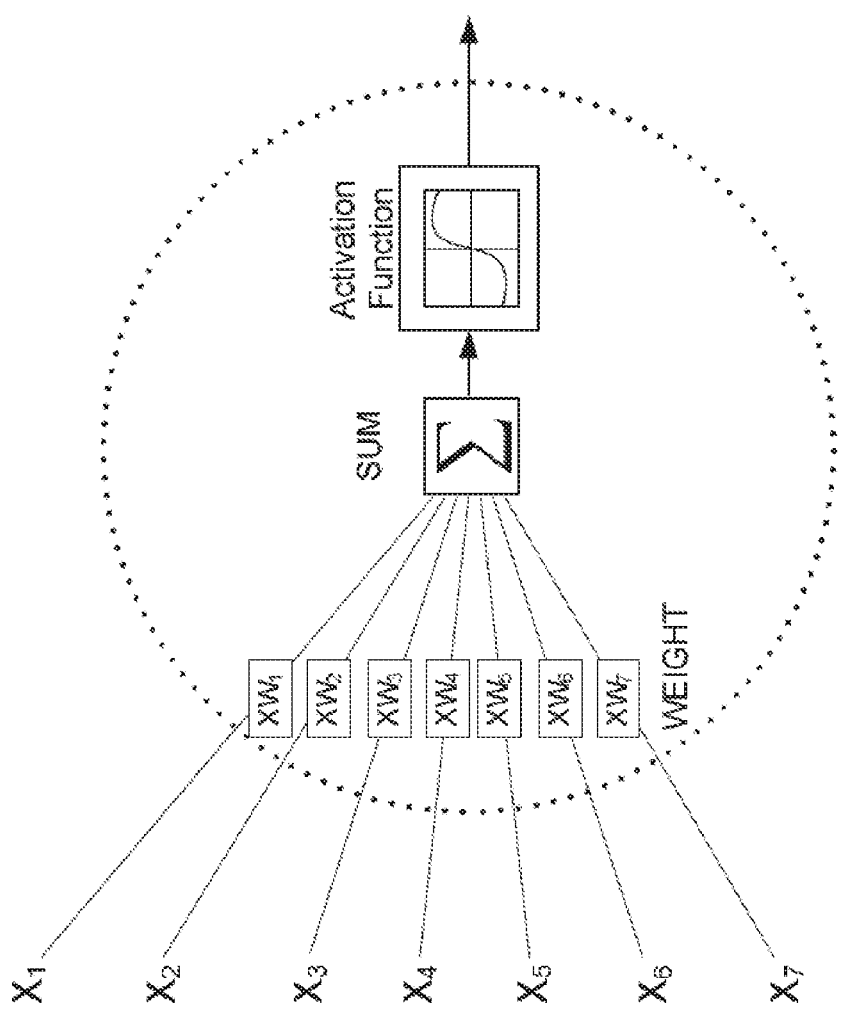
FIG. 1A is a highly simplified schematic view of a neuron.
Figure 2:
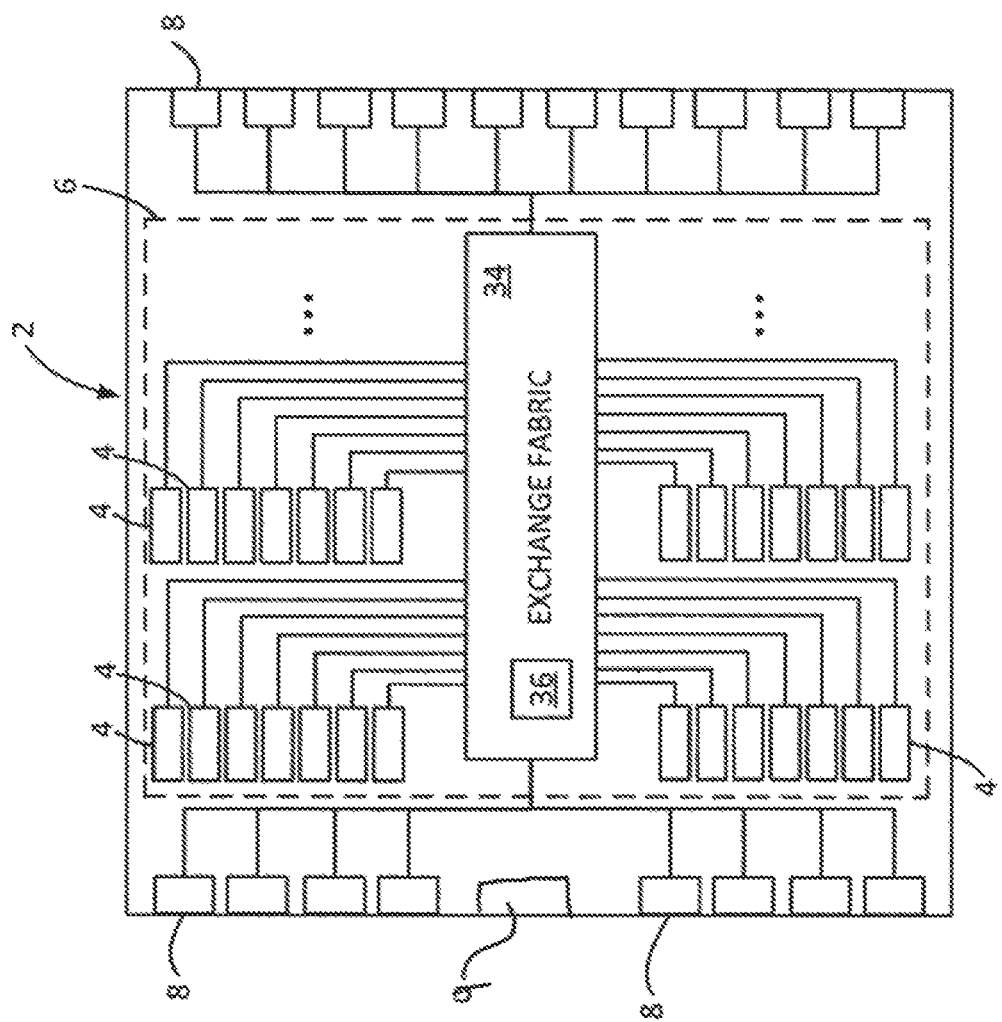
FIG. 2 is a schematic diagram of a multi-tile processing unit.

Reference is made to FIG. 2, which illustrates an example of a multi-tile processing unit 2. The processing unit 2 comprises an array 6 of multiple processor tiles 4 and an interconnect 34 connecting between the tiles 4. The processing unit 2 may be implemented alone as one of multiple dies packaged in the same IC package. The interconnect 34 may also be referred to herein as the "exchange fabric" 34 as it enables the tiles 4 to exchange data with one another. Each tile 4 comprises a respective instance of a processor and memory. For instance, by way of illustration the processing unit 2 may comprise of the order of hundreds of tiles 4, or even over a thousand. For completeness, note also that an "array" as referred to herein does not necessarily imply any particular number of dimensions or physical layout of the tiles 4.

In embodiments, each processing unit 2 also comprises one or more external links 8, enabling the processing unit 2 to be connected to one or more other processing units (e.g. one or more other instances of the same processing unit 2). These external links 8 may comprise any one or more of: one or more processor-to-host links for connecting the processing unit 2 to a host processor, and/or one or more processor-to-processor links for connecting together with one or more other instances of the processing unit 2 on the same IC package or card, or on different cards. In one example arrangement, the processing unit 2 receives work from a host processor (not shown) which is connected to the processing unit 2 via one of the processor-to-host links in the form of input data to be processed by the processing unit 2. Multiple instances of the processing unit 2 can be connected together into cards by processor-to-processor links. Thus a host accesses a computer, which is architected as a multi-tile system on a chip, depending on the workload required for the host application. The processing unit 2 functions as an accelerator subsystem for the host processor.

The interconnect 34 is configured to enable the different tiles 4 in the array 6 to communicate with one another. However, as well as there potentially being dependencies between threads on the same tile 4, there may also be dependencies between the portions of the program running on different tiles 4 in the array 6. A technique is, therefore, required to prevent a piece of code on one tile 4 running ahead of data upon which it is dependent being made available by another piece of code on another tile 4.

Each tile 4 is itself a processor capable of executing instructions (code) from a local instruction memory and handling data in local data memory. A tile 4 may comprise a respective instance of a barrel-threaded processor and a memory. For instance, by way of illustration the processing unit 2 may comprise of the order of hundreds of tiles 4, or even over a thousand. For completeness, note also that an "array" as referred to herein does not necessarily imply any particular number of dimensions or physical layout of the tiles 4.

Communication between tiles 4 on the processing unit 2 occurs in a time deterministic fashion. However, other forms of inter tile exchange are possible. There may be dependencies between the portions of the program running on different tiles 4 in the array 6. That is, processing data on one tile may depend on results from another tile, e.g. may provide results on which another tile depends. A technique is, therefore, required to prevent a piece of code on one tile 4 running ahead of data upon which it is dependent being made available by another piece of code on another tile 4.

Parallel programming models for AI and Data Science usually follows a 3-phase iterative execution model: Compute, Barrier, and Exchange. The implications are that data transfer to and from a processor is usually barrier dependent to provide data-consistency between the processors and between each processor and a host. Typically used data consistency models are Bulk Synchronous Parallel (BSP), Stale Synchronous Parallel (SSP) and Asynchronous. Embodiments described herein use a BSP model, but it will be apparent that the other synch models could be utilised as an alternative.

Figure 3:
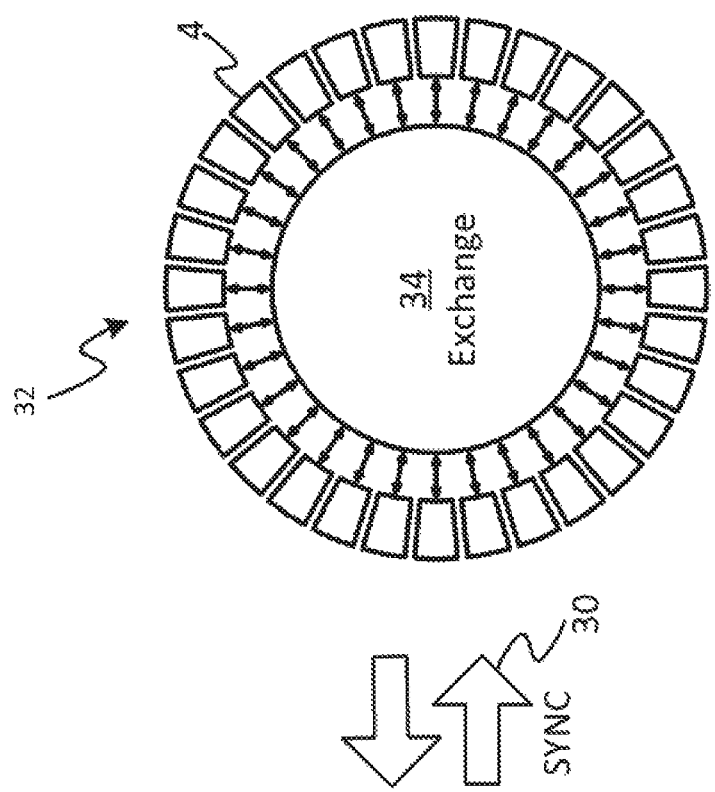
FIG. 3 is a schematic diagram illustrating the compute and exchange phases within a multi-tile processing unit.
Figure 3:
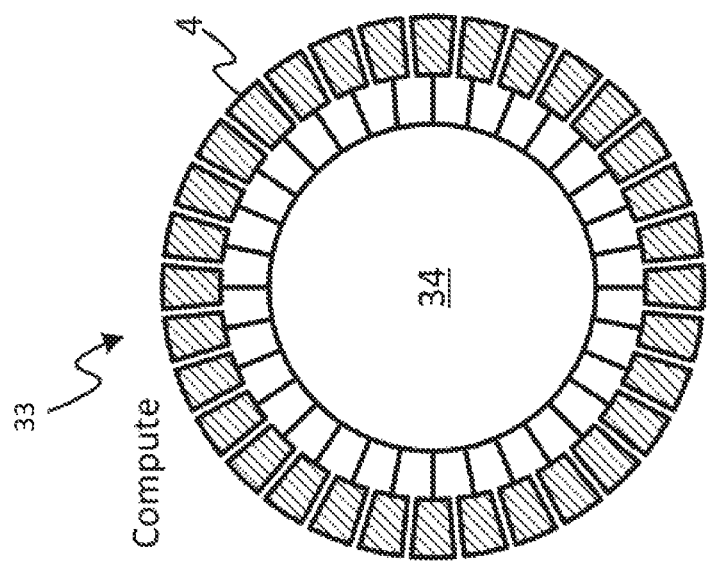
Figure 3A:
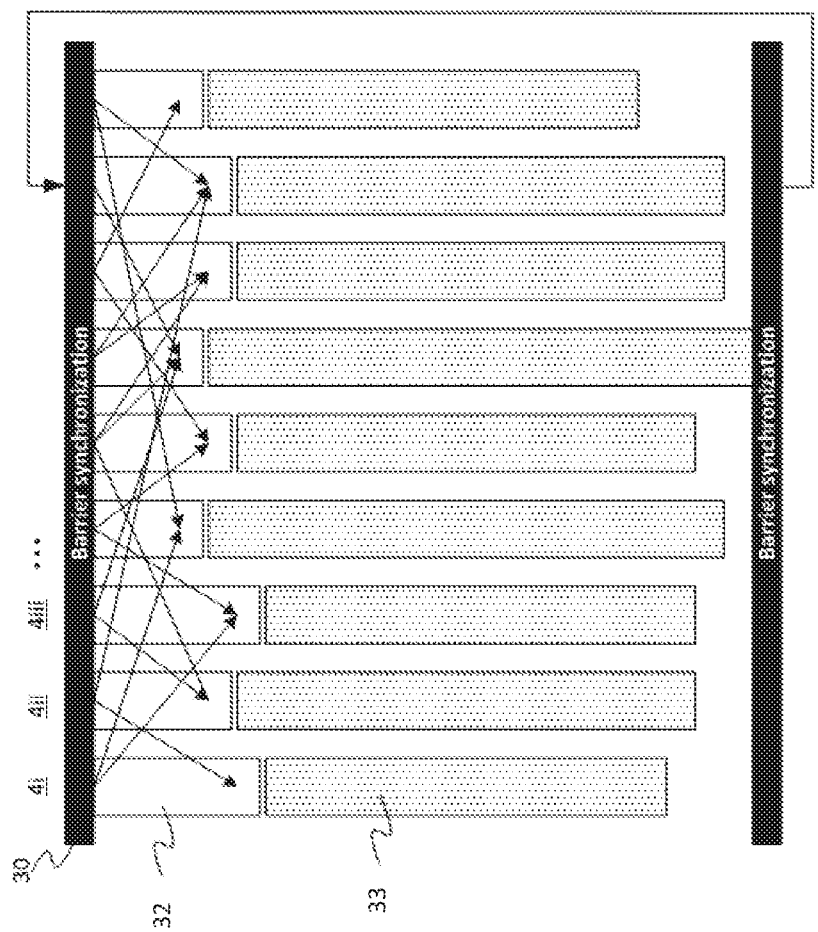
FIG. 3A illustrates exchange of data in a bulk synchronous parallel system.

Reference is made to FIGS. 3 and 3A, which illustrate an implementation of a BSP exchange scheme in which each tile 4 performs a compute phase 33 and an exchange phase 32 in an alternating cycle, separated from one to the other by a barrier synchronization 30 between tiles. In the case, illustrated by FIGS. 3 and 3A, a barrier synchronization is placed between each compute phase 33 and the following exchange phase 32.

During the compute phase 33, each tile 4 performs one or more computation tasks locally on-tile, but does not communicate any results of these computations with any others of the tiles 4. In the exchange phase 32, each tile 4 is allowed to exchange one or more results of the computations from the preceding compute phase to and/or from one or more others of the tiles, but does not perform any new computations until it has received from other tiles 4 any data on which its task(s) has/have dependency. Neither does it send to any other tile, any data except that computed in the preceding compute phase. It is not excluded that other operations such as internal control-related operations may be performed in the exchange phase 32. The communication external to the tile group may optionally utilise the BSP mechanism, but alternatively may not utilize BSP and may instead use some other synchronization mechanism of its own.

According to the BSP principle, a barrier synchronization 30 is placed at the juncture transitioning from the compute phase 33 into the exchange phase 32, or the juncture transitioning from the exchange phase 32 into the compute phase 33, or both. That is to say, either: (a) all tiles 4 are required to complete their respective compute phases 33 before any in the group is allowed to proceed to the next exchange phase 32, or (b) all tiles 4 in the group are required to complete their respective exchange phases 32 before any tile in the group is allowed to proceed to the next compute phase 33, or (c) both of these conditions are enforced. In all three variants, it is the individual tiles which alternate between phases, and the whole assembly which synchronizes. The sequence of exchange and compute phases may then repeat over multiple repetitions. In BSP terminology, each repetition of exchange phase and compute phase is sometimes referred to as a "superstep" (though note that in the literature the terminology is not always used consistently: sometimes each individual exchange phase and compute phase individually is called a superstep, whereas elsewhere, as in the terminology adopted herein, the exchange and compute phases together are referred to as a superstep).

Note also, it is not excluded that multiple different independent groups of tiles 4 on the same processing unit 2 or different processing units could each form a separate respective BSP group operating asynchronously with respect to one another, with the BSP cycle of compute, synchronize and exchange being imposed only within each given group, but each group doing so independently of the other groups. I.e. a multi-tile array 6 might include multiple internally synchronous groups each operating independently and asynchronously to the other such groups (discussed in more detail later). In some embodiments there is a hierarchical grouping of sync and exchange, as will be discussed in more detail later.

FIG. 3A illustrates the BSP principle as implemented amongst a group 4i, 4ii, 4iii of some or all of the tiles in the array 6, in the case which imposes: (a) a barrier synchronization from compute phase 33 to exchange phase 32 (see above). Note that in this arrangement, some tiles 4 are allowed to begin computing 33 whilst some others are still exchanging.

Figure 4:
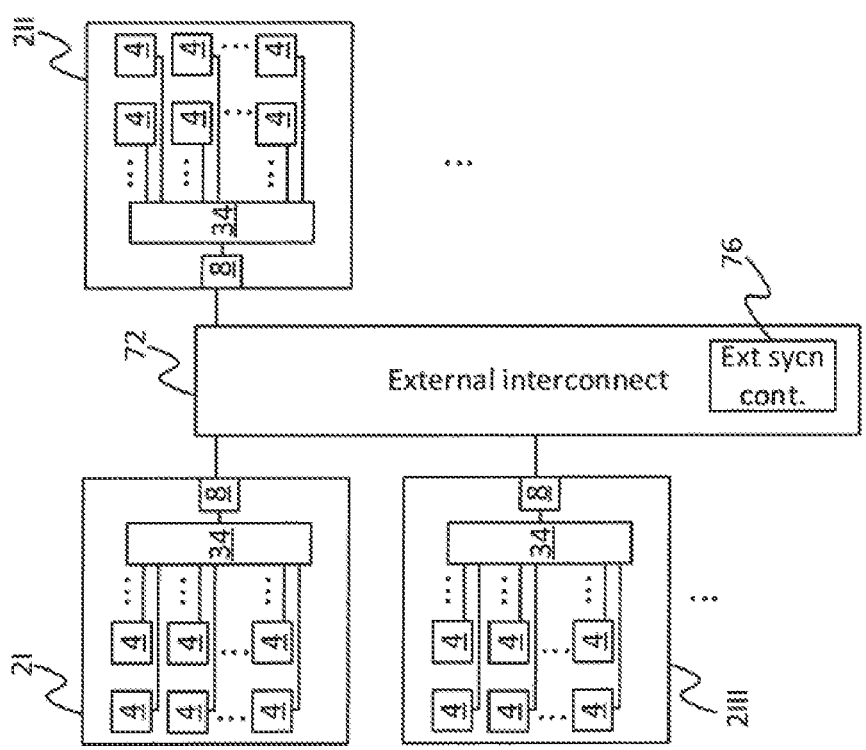
FIG. 4 illustrates an arrangement of multiple chips connected over an external interconnect.

In embodiments, multiple instances of the processing unit 2 are connected together to form an even larger array of tiles 4 spanning multiple processing units 2. This is illustrated in FIG. 4. The processing units 2 are connected together by an external interconnect 72. This may connect between processing units 2 on the same IC package, different IC packages on the same card, and/or different IC packages on different cards. As well as providing a conduit for exchange of data between tiles 4 on different processing units, the external interconnect 72 also provides hardware support for performing barrier synchronization between the tiles 4 on different processing units 2 and aggregating the local exit states of the tiles 4 on the different processing units 2.

When using the processing units 2 for training a neural network, the calculations performed are performed during the compute phase 33. These calculations include the determining of activations, the evaluation of the loss function and the gradient of the loss function, and the determining of the updates to the model parameters, i.e. weights and biases. During the exchange phase, the activations of the output layer (i.e. the outputs of the neural network) are exchanged between processing units 2 and used, during a following one or more compute phases, to determine a dissimilarity measure of the loss function. This dissimilarity measure is referred to in parts of this description as the distillation loss.

Figure 5:
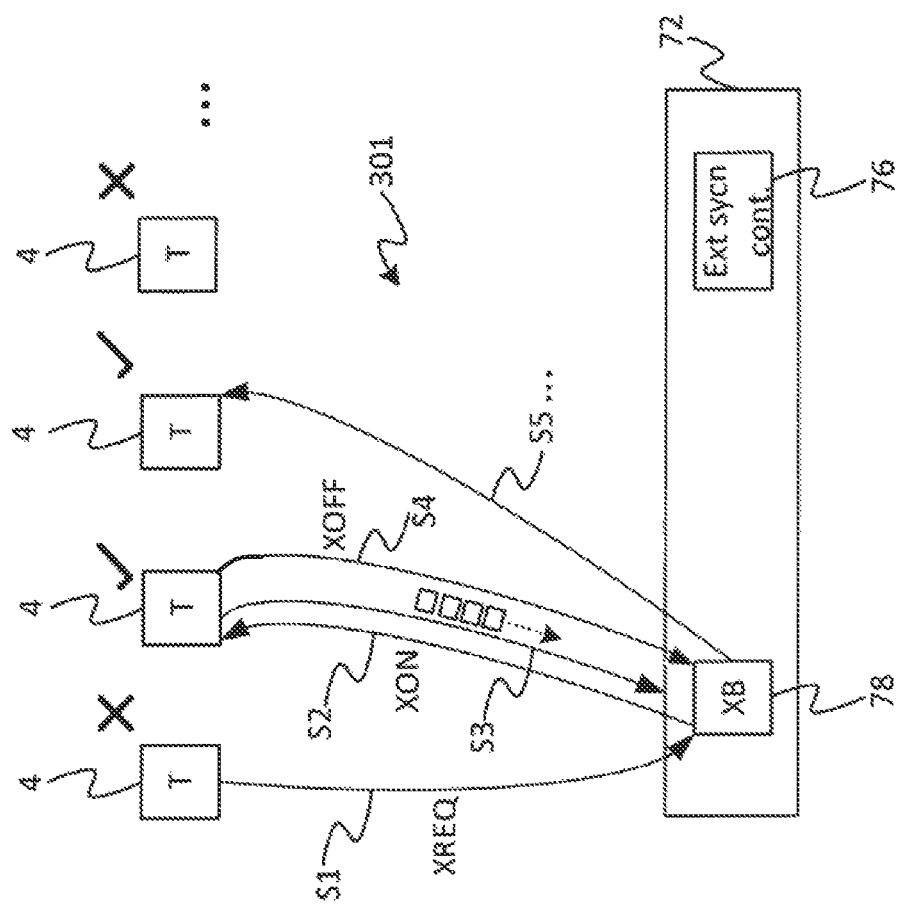
FIG. 5 illustrates the sending of data packet by tiles on one chip to another chip.

FIG. 5 illustrates an exemplary mechanism for communicating between processing units 2 (external exchange). This mechanism is non-time-deterministic. The mechanism is implemented in dedicated hardware logic in the external interconnect 72. Data is sent over the external interconnect 72 in the form of packets. Unlike the packets sent over the internal interconnect 34, these packets have headers: as the order of transmission can change, they require the destination address to be present in the packet header. The external interconnect 72 includes a routing table for statically routing the data packets between the different processing units in dependence upon the headers of the data packets.

At the physical layer, the interconnect mechanism is lossy, but at the transaction layer, the mechanism is not lossy due to the architecture of the link layer: if a packet is not acknowledged it will be resent automatically by the hardware in the interconnect 72. The possibility for loss and resending at the data link layer, however, means that the delivery of data packets over the external interconnect 72 is not time-deterministic. Further, all the packets of a given exchange may arrive together or separated apart in time, and in any order, so the external interconnect requires flow control and queuing. Further, the interconnect may use clock-data-recovery (CDR) technology to infer a clock from a received data stream having sufficient data signal transitions to maintain bit-lock. This inferred clock will be of unknown phase relationship to the sending clock and hence represent an additional source of non-determinism.

As illustrated, the external interconnect 72 comprises an external exchange block (XB) 78. The compiler nominates one of the tiles 4 to send an external exchange request (XREQ) to the exchange block 78 (operation S1). The XREQ is a message comprising one or more control packets, indicating which of the tiles 4 have data packets (content) to send to another tile or tiles 4 on another processing unit 2. This is illustrated schematically in FIG. 5 by the ticks and crosses: by way of an example scenario, those labelled with a tick have data packets to send externally and those labelled with a cross do not. In operation S2, the exchange block 78 sends an exchange-on (XON) control packet to a first of the tiles 4 with data to send externally. This causes the first tile to start sending its packets to the relevant destination via the external interconnect 78 (operation S3). The data packets received from the first tile at the external interconnect are statically routed to the destination using a routing table in the external interconnect 78. If at any time, the XB 78 is unable to continue sending packets to the interconnect (e.g. due to a previous packet loss and re-transmission in the interconnect, or due to over-subscription of the external interconnect by many other XBs and tiles) the XB 78 will send an exchange-off (XOFF) to that tile before the XBs queue overflows. Once the congestion is cleared and the XB 78 again has sufficient space in its queue it will send an XON to the tile allowing it to continue transmitting its content. Once this tile 4 has sent its last data packet, then in operation S4, the tile 4 sends an exchange-off (XOFF) control packet to the XB 78. In response, the XB 78, in operation S5 sends another XON to the next tile 4 with data packets to send, and so forth. Therefore, control over the sending is passed between tiles by the signalling of XON and XOFF between the tiles 4 and the dedicated hardware logic in the form of the external exchange block 78.

Figure 5A:
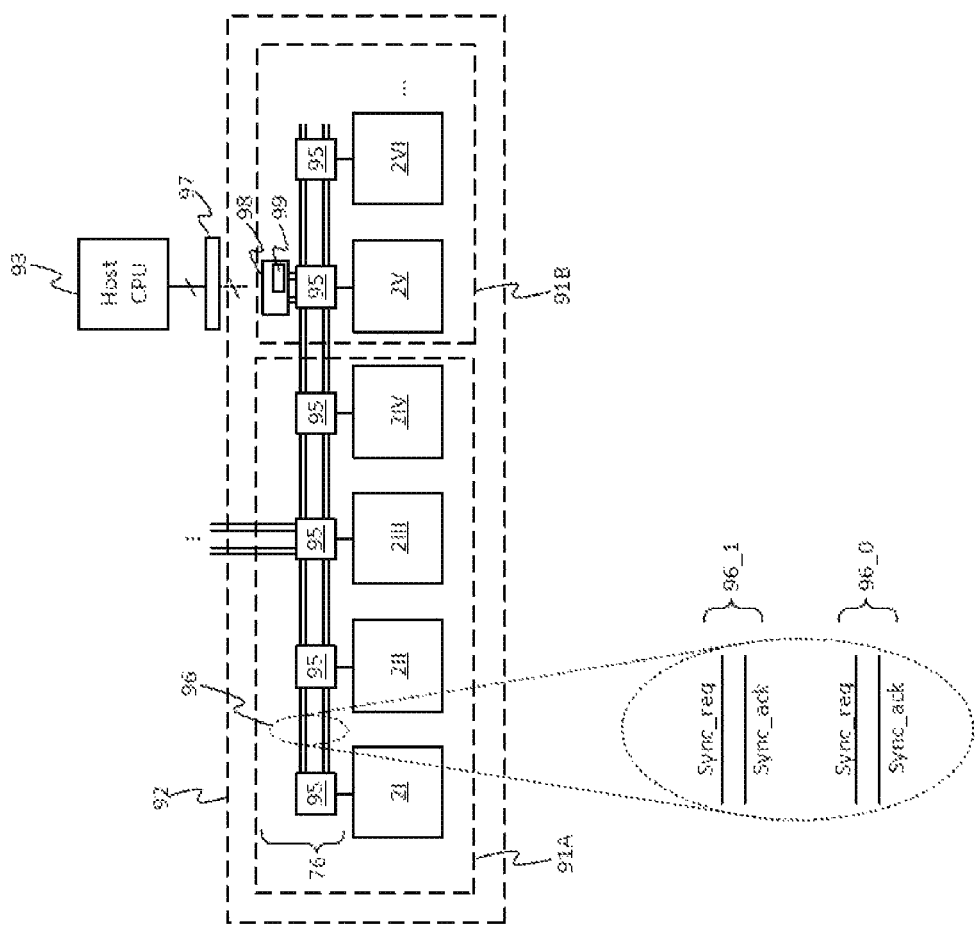
FIG. 5A illustrates an arrangement of multiple chips and a host connected over an external interconnect.

An example mechanism for implementing the synchronization amongst a selected sync group 91, 92 is illustrated in FIG. 5A. As illustrated, the external sync logic 76 in the external interconnect 72 comprises respective sync blocks 95 associated with each respective chip 2. The sync blocks 95 are referred to herein as global sync peripherals (GSPs) 95. Each GSP 95 comprises respective gating logic and a respective sync aggregator. The gating logic comprises hardware circuitry which connects together the chips 2 in a daisy chain topology for the purpose of synchronization and exit state aggregation, and which propagates the sync and exit state information in accordance with the following. The sync aggregator comprises hardware circuitry configured to aggregate the synchronization requests (sync_req) and the exit states in accordance with the following.

The respective GSP 95 associated with each chip 2 is connected to its respective chip 2, such that it can detect the sync request (Sync_req) raised by that chip 2 and the exit state of that chip 2, and so that it can return the sync acknowledgment (Sync_ack) and global exit state to the respective chip 2. The respective GSP 95 associated with each chip 2 is also connected to the GSP 95 of at least one other of the chips 2 via an external sync interface comprising a bundle of four sync wires 96, details of which will be discussed in more detailed shortly. This may be part of one of the chip-to-chip links 8. In the case of a link between chips on different cards, the interface 8 may for example comprise a PCI interface and the four sync wires 96 may be implemented by re-using four wires of the PCI interface. Some of the chips' GSPs 95 are connected to that of two adjacent chips 2, each connection via a respective instance of the four sync wires 96. This way, the chips 2 can be connected in one or more daisy chains via their GSPs 95. This enables the sync requests, sync acknowledgments, running aggregates of exit states, and global exit states, to be propagated up and down the chain.

In operation, for each sync group 91, 92, the GSP 95 associated with one of the chips 2 in that group is set as the master for synchronization and exit state aggregation purposes, the rest in the group being slaves for this purpose. Each of the slave sync blocks 95 is configured with the direction (e.g. left or right) that it needs to propagate sync requests, sync acknowledgments and exit states for each sync group 91, 92 (i.e. the direction toward the master). In embodiments these settings are configurable by software, e.g. in an initial configuration phase after which the configuration remains set throughout the subsequent operation of the system. For instance, this may be configured by the host processor. Alternatively, it is not excluded that the configuration could be hard-wired. Either way, the different sync groups 91, 92 can have different masters and, in general, it is possible for a given chip 2 (or rather its GSP 95) to be master of one group and not another group of which it is a member, or to be master of multiple groups.

For instance, by way of illustration, consider the example scenario of FIG. 5A. Say, for the sake of example, that the GSP 95 of chip 21V is set as the master of a given sync group 91A. Consider now the first chip 21 in the chain of chips 2, connected via their sync blocks 95 and wires 96 ultimately to chip 21V. When all the worker threads of the current compute phase on the first chip 21 have executed an EXIT instruction, and the supervisors on all the (participating) tiles 4 have all executed a SYNC instruction specifying the sync group 91A, then the first chip 21 signals its sync readiness to its respective associated GSP 95. The chip 21 also outputs to its respective GSP 95 its chip-level aggregated exit state (the aggregate of all the exiting workers on all the participating tiles on the respective chip 21). In response, the GSP 95 of the first chip 21 propagates a sync request (Sync_req) to the GSP 95 of the next chip 21I in the chain. It also propagates the exit state of the first chip 21 to the GSP 95 of this next chip 21I. The GSP 95 of this second chip 21I waits until the supervisors of its own (participating) tiles 4 have all executed a SYNC instruction specifying the sync group 91A, causing the second chip 21I to signal sync readiness. Only then does the second chip's GSP 95 propagate a sync request to the GSP 95 of the next (third) chip 21II in the chain, and also propagates a running aggregate of the exit state of the first chip 21 with that of the second 21I. If the second chip 21I had become sync ready before the first 21, then the GSP 95 of the second chip 21I would have waited for the first chip 21 to signal a sync request before propagating the sync request to the GSP 95 of the third chip 21II. The GSP 95 of the third chip 21II behaves in a similar manner, this time aggregating the running aggregate exit state from the second chip 21I to obtain the next running aggregate to pass onwards, etc. This continues toward the master sync block, that of chip 21V in this example.

The GSP 95 of the master then determines a global aggregate of all the exit states based on the running aggregate it receives and the exit state of its own chip 21V. It propagates this global aggregate back out along the chain to all the chips 2, along with the sync acknowledgement (Sync_ack).

If the master is part way along a chain, as opposed to being at one end as in the above example, then the sync and exit state information propagates in opposite directions either side of the master, both sides toward the master. In this case, the master only issues the sync acknowledgment and global exit state once the sync request from both sides has been received. E.g. consider the case where chip 21II is master of group 92. Further, in embodiments the GSP 95 of some of the chips 2 could connect to that of three or more other chips 2, thus creating multiple branches of chains toward the master. Each chain then behaves as described above, and the master only issues the sync acknowledgment and global exit state once the sync request from all chains has been received. And/or, one or more of the chips 2 could connect to an external resource such as the host processor, a network card, a storage device or an FPGA.

In embodiments, the signalling of the sync and exit state information is implemented as follows. The bundle of four sync wires 96 between each pair of chips 2 comprises two pairs of wires, a first pair 96_0 and a second pair 96_1. Each pair comprises an instance of a sync request wire and an instance of a sync acknowledgment wire. To signal a running aggregate exit state of value 0, the GSP 95 of the sending chip 2 uses the sync request wire of the first wire pair 96_0 when signalling the sync request (sync_req), or to signal a running aggregate of value 1 the GSP 95 uses the sync request wire of the second wire pair 96_1 when signalling the sync request. To signal a global aggregate exit state of value 0, the GSP 95 of the sending chip 2 uses the sync acknowledgment wire of the first wire pair 96_0 when signalling the sync acknowledgment (sync_ack), or to signal a global aggregate of value 1 the GSP 95 uses the sync request wire of the second wire pair 96_1 when signalling the sync acknowledgment.

Note that the above is only the mechanism for propagating sync and exit state information. The actual data (content) is transmitted by another channel, for example as discussed earlier with reference to FIG. 5. Further, it will be appreciated that this is only one example implementation, and the skilled person will be capable of building other circuits for implementing the disclosed synchronization and aggregation functionality once given the specification of that functionality disclosed herein. For instance, the synchronisation logic (95 in FIG. 5A) could instead use packets carried over the interconnect 34, 72 as an alternative to dedicated wiring. E.g. the sync_req and/or the sync_ack could each be transmitted in the form of one or more packets.

There is additionally provided a mechanism for enabling a host processor 93 to communicate with any processing unit 2 that operates with either a single point of rendezvous for all its participants (such as BSP), or in some embodiments a sufficiently small number of points of rendezvous (such as a number of independent processing units all connected to one host) such that implementation of a host-processor friendly synchronisation mechanism can be implemented in hardware in a particularly efficient manner. This situation may contrasted with a traditional CSP approach in which the number of points of rendezvous is application specific and thus the synchronization mechanisms such as semaphores must be software defined and thus subject to inefficiencies that follow from this (e.g. processor interrupt latency).

As shown in FIG. 5A (and referring also to FIG. 4), the overall system comprises at least one host processor 93, and an external host interface 97 for connecting the host processor 93 to the external interconnect 72 (including to the external sync logic 76). For example, in embodiments, the host interface 97 may take the form of a PCI interface. The sync logic 76 of the external interconnect 72 further comprises at least one "host sync proxy" (HSP) module 98. The HSP module 98 is connected between the interface 97 and one of the GSPs 95. The HSP module 98 is arranged to act as a proxy on behalf of the host 93 for synchronization purposes, to enable the host processor 93 to participate in the synchronization amongst at least one of the sync zones or groups 91, 92, as will be discussed in more detail shortly.

In embodiments, one HSP module 98 is provided per chip 2 and per corresponding GSP 95. In this case, whichever GSP 95 is configured as the master of a given sync group 91, 92, the HSP 98 of that sync block is set as the proxy of the host 93 within the group and the other HSPs are disabled. Thus, as with the sync blocks 95, the HSPs 98 can be configured per sync group 91, 92. So one HSP 98 can be set as the host proxy for one sync group, e.g. 91A or 91B, whilst another HSP 98 can be set as the host proxy for another group, e.g. 91B or 92; or the same HSP 98 may be set as the host proxy for multiple groups, e.g. both 91 and 92. To this end, the host interface 97 is connected to the HSPs 98 so that the HSP 98 selected for each group 91, 92 may be configurable by software by writing to registers of the HSP modules 98 via the PCI interface 97. Alternatively, it is not excluded that the configuration could be hard-wired or the HSP registers updated via a different interface or protocol. It is also not excluded that in yet further alternative embodiments, there could be a single fixed HSP 98 per sync group 91, 92, or even a single fixed HSP 98 for the whole array or subsystem 6.

The or each host sync proxy (HSP) module 98 comprises hardware circuitry configured to enable the host 93 to participate in the respective sync group 91, 92 in which that HSP 98 is arranged to act as the host's proxy. A sync request emitted by the tiles 4, if it is a sync with host involvement, will be conveyed by the sync logic 95 to the active HSP 98 for that group whereas a sync request which does not specify host involvement will be aggregated and returned to the requesting tiles without involving the HSP 98 in any way. Thus the tiles 4 determine by virtue of the program they execute when, if at all, the processing unit 2 requires to interact with the host via the HSP 98.

By way of illustration, consider an instance of the HSP 98 configured to act as proxy of the host 93 with respect to the global sync group 92. E.g. in FIG. 5A, purely by way of illustration. It will be appreciated that analogous functionality can be described for the host's participation in any, lower level sync group also, such as those labelled 91.

The host 93 is asynchronous and non-time-deterministic with respect to the rest of the sync group 92, and separated by a relatively large amount of wiring and physical logic. In addition any communication with the host likely requires the host to take an interrupt following which there is a considerable latency for handling the interrupt and then switching contexts to the host code that would deal with the sync request. These factors mean the latency of any interaction involving the host 93 is poor. It would be desirable to avoid needing to communicate directly with the host 93 as much as possible.

To this end, the HSP 98 comprises a set of registers comprising at least one counter 99, and associated counting logic arranged to operate as follows. The counter 99 is arranged so that an integer value n can be written to it by the host 93 via the host interface 97, in embodiments such that the value written is added to the value already present in this register 99. When the HSP counter 99 has a value of 1 or greater then in the sync group 92 in which the HSP 98 in question is acting as the host's proxy, the HSP 98 is then configured to generate a sync acknowledgement (sync_ack) when it receives a sync request from the tiles 4 in the sync group 92. The associated counting logic automatically decrements n by one in the counter 99 each time a sync acknowledgement is generated and the corresponding barrier is passed (e.g. barrier 80 in the case of sync group 92). This process occurs without the requirement for the HSP 98 to contact or otherwise interrupt the host. But if the counter value n has now reached zero, the HSP 98 does not generate the sync-acknowledgment and therefore does not allow the tiles 4 in the group 92 to continue running again until both: i) all the tiles 4 in that group 92 have sent a sync request (sync_req), and ii) the HSP 98 performs a write to the HSP 98 via the host interface 97 explicitly granting the barrier to be released. In embodiments, this second subcondition ii) is implemented by the HSP 98 checking that the HSP counter 99 now has a value of 1 or greater—i.e. the counter has been granted with more credits again by the host 93 writing to the counter 99 via the host interface 97. Thus the tiles 4 of the group can be allowed to continue running through n barriers without deferring at all to the host 93, after which they must then synchronize with the host 93 (and may then exchange data to and/or from the host). In some cases, the host may arrange its operation for maximum efficiency by ensuring that the HSP counter value never falls to zero and thus the processing unit 2 never pauses to sync with the host.

Preferably the software running on the tiles 4 is free to choose whether to request HSP involvement or not, by collectively marking their respective sync requests as either requiring or not requiring host involvement. In such embodiments the above behaviour is applied only by the HSP 98 for the barriers corresponding to sync requests marked as requiring host involvement (the "involvement" of the host for any given barrier being either the proxy granting of the sync ack by the HSP 98 on behalf of the host, or occasionally the explicit granting of more credit). The program is arranged so that all tiles 4 in a given group 91, 92 signal the same choice in their sync requests (HSP involvement or not) for a given barrier synchronization. In embodiments the host involvement is selected by different variants of the mode of the SYNC instruction. That is, for each sync group 91, 92, there is effectively two variants that the operand of the SYNC instruction can take: zone_1_host, zone_1_no_host; and zone_2_host, zone_2_no_host. The execution unit 18 is configured to act upon the operand, and in response to cause the synchronization logic in the interconnect 72, 76 to signal the host involvement marker accordingly. In other embodiments however, it is not excluded that other mechanisms could be implemented for requesting host involvement, or even (though less preferred) that host involvement is hard-wired and therefore always imposed (i.e. counter 99 is always consulted).

Another function of the HSP 98 is to notify the host by writing a notification message directly to the host's memory (in this embodiment, over the PCI interface). The notification message includes the current contents of the HSP 98 which includes the aforementioned counter value. Optionally the HSP 98 can also be configured to interrupt the host at this point. The host therefore has the option of waiting for an interrupt from the HSP or of polling the memory location written by the HSP with either method serving to alert the host to the current new state of the HSP including the value of its counter. The host program may then take such steps as it requires in order to prepare for future barriers following which it posts incremental values to the HSP counter 99.

In embodiments, preparation for barriers performed by the host may include the preparation of data to be fetched by the processing unit 2, such as experience data sets required by the processing unit 2 for the next stage in learning a model. Preparation in this context may include fetching the data from storage disks or other media, formatting data in a form which is required by the training algorithm running on the processing unit 2 or decompression of image data. Additionally, preparation for barriers may include consuming output data produced by the processing unit 2.

Another function of the HSP 98 is to communicate the exit state value of the processing unit 2 that accompanies the sync request from the Tiles 4 to the host 93, via the notification message mentioned previously.

Another function of the HSP 98 is to allow the host program to specify its own exit state value by writing it to one of the HSP registers. Thereafter, when the HSP 98 generates a sync-acknowledgment for the tiles 4, the aggregated exit state of all the tiles 4 is also aggregated with the exit state value that has been provided by the host 93.

Another function of the HSP 98 is to allow the host program to specify an expected exit state value which corresponds to the exit state it most commonly expects the tiles 4 to provide along with their sync request. When the host 93 provides an expected exit state in this way, then so long as the tiles 4 exit state matches the value provided by the host the operation of the HSP is as described previously, with the HSP generating a sync-acknowledge while the HSP counter value n is greater than zero. Alternatively, if the host's expected exit state value does not match the value provided by the tile 4 then the HSP 98 does not generate a sync-acknowledgment to the Tiles 4. Because the tile's exit state 4 is provided during the notification write mentioned above and the processing unit 2 will be stalled at the barrier where the tile exit state and host exit state differ, the host program is able to take such barrier preparation steps as may be required to satisfy the conditions signalled by the change in exit state and then re-establish the counter value n such that the value reflects the new preparations made. To facilitate this re-establishment of the counter value, the HSP interprets a write to the HSP register with a count value of zero as an instruction to zero the counter value rather than to increment the counter value by zero which would have the undesired effect of leaving the counter value unchanged.

An unexpected exit state event as described above may entail abandoning previous preparations made by the host in anticipation of the Tile exit state matching the expected value but in general the loss of efficiency resulting from this event is small compared to the loss of efficiency that would be incurred if the processing unit 2 had to interrupt or involve the host directly at each barrier, so long as the occurrence of the unexpected exit state value is rare relative to occurrences of the expected exit state value.

Figure 6:
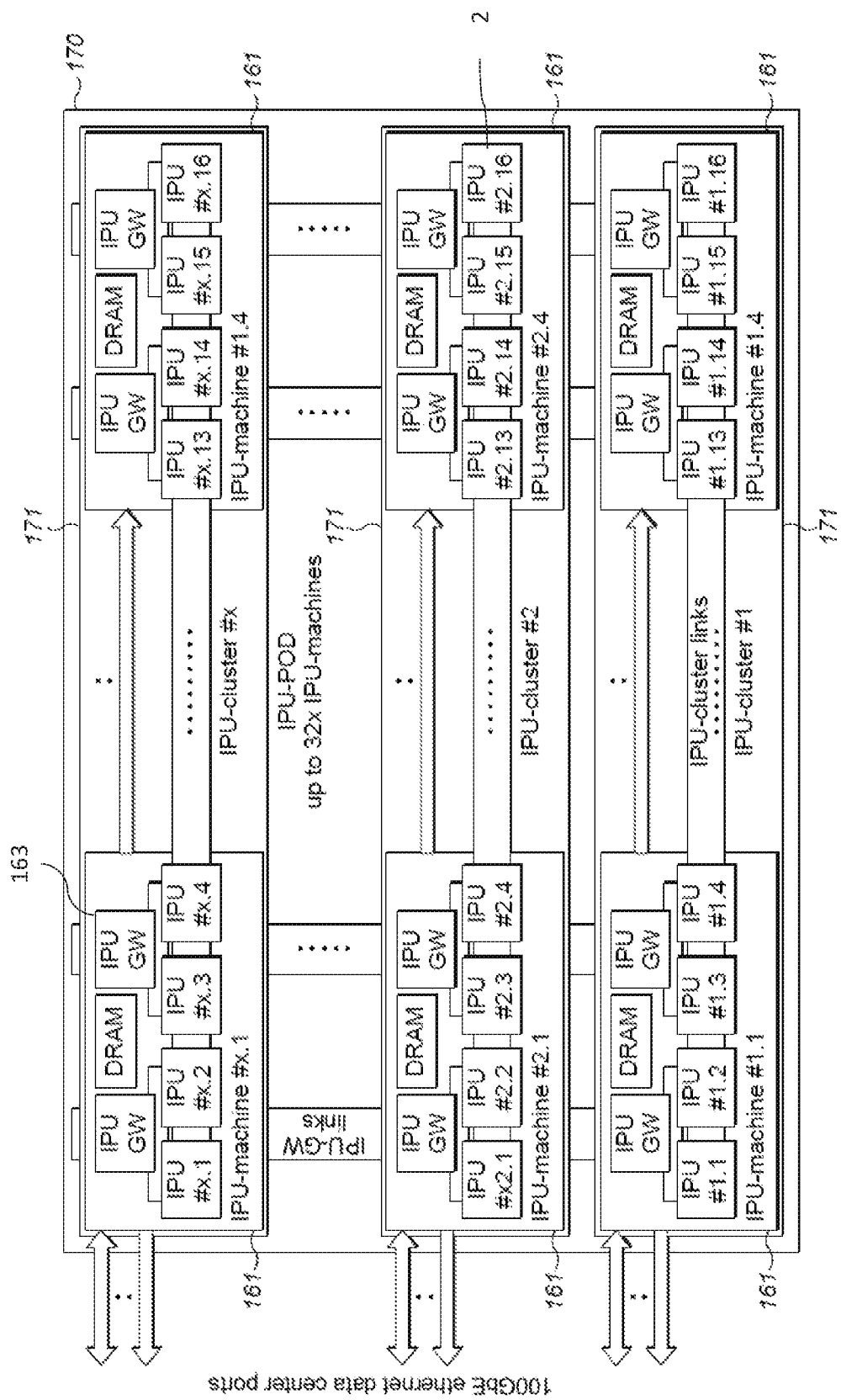
FIG. 6 illustrates an example of a plurality of clusters of processing units for training a neural network in a distributed manner.

In some cases, the processing units 2 may be arranged into clusters and connected together using gateways. Such clusters may be applied for training neural networks when a larger amount of processing power is required than is available in a single machine. Reference is made to FIG. 6, which shows an example of an apparatus 170, comprising a plurality of machines 161. A plurality of machines 161 are arranged into an apparatus 171, which is referred to as a cluster 171. Each cluster 171 comprises up to 4 machines 161. A plurality of clusters 171 are arranged into an apparatus 170, which is referred to as a pod 170. Each pod 170 comprises up to 32 machines 161. By scaling the system in this manner, a resulting pod 171 comprises 128 processing units, resulting in system with 16 PFLops and 8 TB of DRAM.

In this model illustrated by FIG. 6, each gateway 163 provides a low latency bridge between two or more groups of processing units 2, allowing processing units 2 attached to different gateways 163 to communicate with each other as if they were connected on the same internal fabric. Packets are received from a processing unit 2 at the XPU ports of a gateway 163. Packets which are targeting memory space that maps to a remote processing unit 2 are detected at the XPU Ports and directed towards the appropriate fabric port of the gateway 163. The packet received at the appropriate processing unit port will be forwarded to the appropriate gateway 163. From there, the gateway 163 will forward the packet to the remote processing unit 2 that is indicated by the memory space targeted by the packet.

Figure 7:
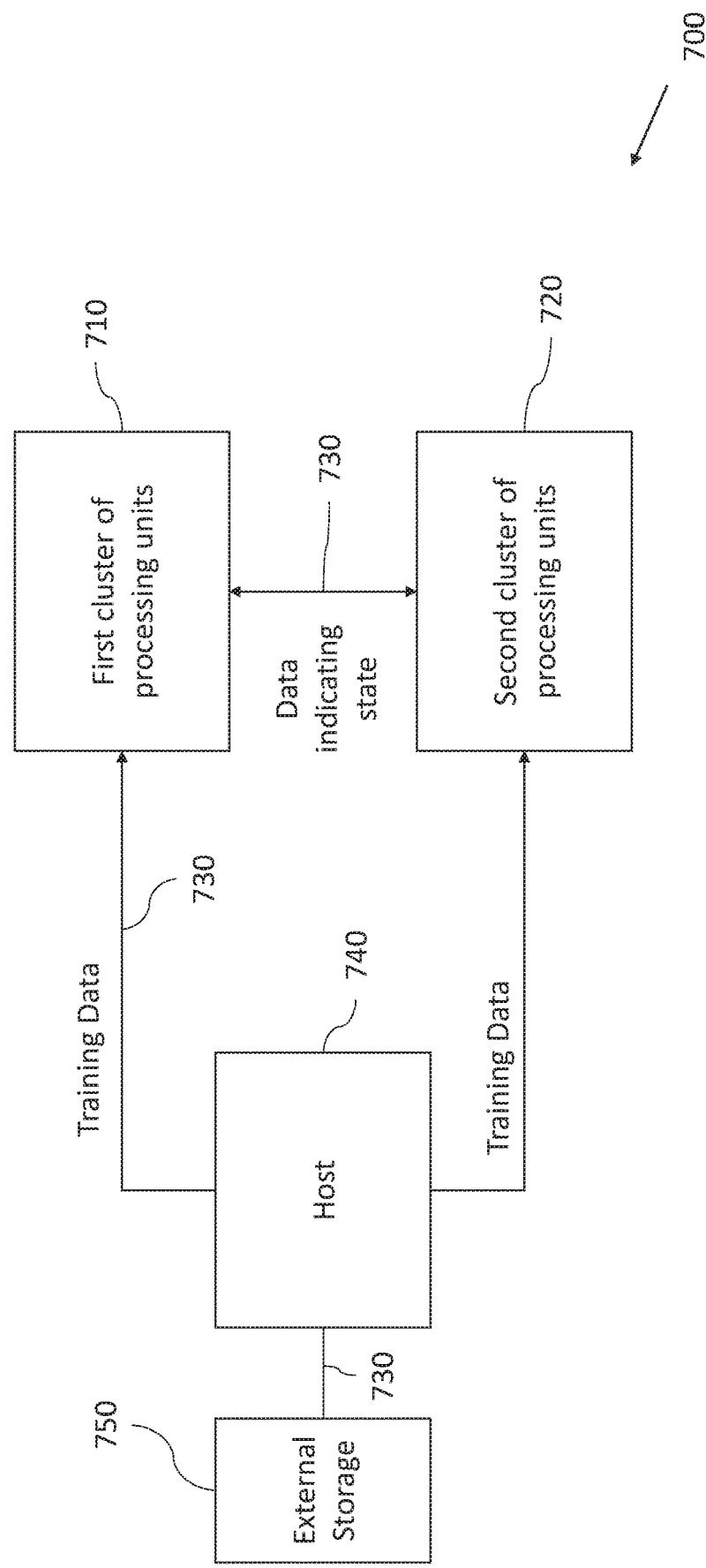
FIG. 7 illustrates a data processing system for training a neural network in a distributed manner.

Reference is made to FIG. 7, which illustrates an example of a system 700 for training a neural network. The system 700 includes a first cluster of processing units 710 and a second cluster of processing units 720. Each of the clusters 710, 720 is a plurality of processing units that are configured to derive output values based on training data provided over an interconnect from external storage 740. Although, in this description, each of the sets 710, 720 of processing units is described as being a cluster 710, 720 of processing units, in some cases, each of these clusters 710, 720 may only comprise a single processing unit. Furthermore, although in the example of FIG. 7, the training is performed using only two clusters 710, 720 of processing units, in other examples, the principles described herein may be applied to training using any number of sets of processing units greater than one.

Each processing unit in a cluster comprises at least one processor configured to execute computer readable instructions to perform the calculating and exchanging operations described herein. Each processing unit in a cluster 710, 720 may be provided on a separate integrated circuit. Each of the processing units in the clusters 710, 720 may be an intelligence processing unit 2 as described above with respect to FIG. 2. Therefore, each processing unit in a cluster 710, 720 may itself comprise a plurality of processors (referred to as tiles above). The interconnect 730 may correspond to an external interconnect 72 (shown in FIG. 4) between the processing units 2 and external storage, e.g. host storage or to a gateway. FIG. 6 illustrates an example of a plurality of IPU clusters that are configured to co-operate. The first cluster 710 and the second cluster 720 may correspond to a different one of the clusters 171 shown in the apparatus 170.

The external storage 750 is configured to provide sets of training data for training a neural network to both of the clusters 710, 720 of processing units. The external storage 750 is associated with a host 740, which provides the training data from the external storage 750 to the clusters 710, 720 over the interconnect 730. The training data provided to one of the clusters 710, 720 may be the same or different to the training data provided to the other of the clusters 710, 720. In the example, only a single host 740 is used to provide the training data to each of the clusters 710, 720. However, in other examples multiple hosts may be used or alternatively, a decentralised setup with no explicit host could be used, but with each of the clusters 710, 720 being able to read data from the external storage 750.

Each of the clusters 710, 720 is configured to run a neural network for training purposes. Different models of the same neural network are run on each of the cluster 710, 720. The models are different in that each of the clusters 710, 720 uses a different set of model parameters for the same neural network. The associated model parameters for a particular cluster 710, 720 are stored in memory of that cluster 710, 720.

The training data is preferably divided into mini-batches for training. A mini-batch of data is a plurality of training samples that are a subset of the whole training data set for training the neural network. The whole training data set comprises a plurality of mini-batches. When the training data is distributed to the clusters of processing units in mini-batches, each mini-batch is used by a recipient cluster 710, 720 to determine a single set of updated model parameters during a single training iteration. During each training iteration, each of the clusters 710, 720 will produce sets of output values/predictions based on a mini-batch of data received and use these output values to compute a gradient of a loss function, which is used to perform an update to the model parameters of the model running on the particular cluster. Once each of the clusters 710, 720 has performed the training using all of the mini-batches defined from the training data set, each of the clusters again performs updating of the model parameters using a number of mini-batches from the same training data set. Each time the clusters 710, 720 cycle through the training data set in this manner is known as an epoch. In some cases, the mini-batches that are used may be the same as the mini-batches used in previous epochs. In other cases, the training data set is shuffled after each epoch and used to define a new set of mini-batches that differ from the previous mini-batches defined from the same training data set. The training process for training the neural network therefore, comprises a plurality of epochs, with each of the plurality of epochs comprising a plurality of training iterations.

Two different methods may be applied to distribute training data to the clusters 710, 720 of processing units. In a first method, a host 740 (which is associated with the external storage 750) accesses the external storage 740 and distributes mini-batches of the training data to each of the clusters. The mini-batches of data distributed to each cluster 710, 720 of processing units may be the same or different.

In a second method, the host 740 distributes the entire set of training data from the external storage 750 to each of the clusters 710, 720 of processing units. Each of the clusters 710, 720, generates or receives from the host 740, a random seed, which it uses to sample the training data set to obtain a mini-batch. In this way, each cluster 710, 720 will use a randomly selected mini-batch of training data for performing the training during a particular training iteration.

Before the training iterations begin, the initial model parameters that are used by each of the clusters 710, 720 at the start of training are initialised to different starting values. These initial values may be determined by the clusters 710, 720 themselves or provided to the clusters 710, 720 from the storage 750.

Each cluster 710, 720 computes one or more sets of output values during a training iteration using the training data supplied to it and using the model parameters for the model associated with that cluster 710, 720. Additionally, each of the clusters 710, 720 exchanges over the interconnect 730, state information for its respective model. For example, the cluster 710 sends to cluster 720 data indicating the state of the model running on cluster 710. Similarly, cluster 720 sends to cluster 710, data indicating the state of the model running on cluster 720.

The data indicating the state of the model may take different forms. In some embodiments, the data indicating the state may be the predictions calculated using the model parameters for the model associated with the cluster 710, 720. These predictions calculated by each cluster 710, 720 are exchanged between the clusters 710, 720. Each cluster 710, 720, then has at least two sets of predictions, a first being calculated using its own model and a second being calculated using the model of the other of the clusters 710, 720. Each of the clusters 710, 720 then evaluates the disimiliarity measure using the two sets of predictions.

It is noted that to evaluate the disimilarity measure, the training data that is used to generate the two sets of predictions must be the same. However, as noted above, the training data provided by external storage 750 to the clusters 710, 720 may be different. In this case, in order to generate a comparable set of predictions, each of the clusters 710, 720 will provide training data to the other of the clusters 710, 720 to allow the other cluster 710, 720 to determine predictions using the same training data. By doing so, both clusters 710, 720 will then obtain predictions that can be compared since they were generated using the same training data.

In other embodiments, the data indicating the state may be the model parameters for the models associated with each of the clusters 710, 720. Each of the clusters 710, 720 receives the model parameters and calculates the output values for the model associated with the other cluster 710, 720. By doing so, each cluster 710, 720 then has two sets of output values, one of which is calculated using the model parameters of its own model and the other of which is calculated using the model parameters of the model of the other cluster. The two sets of predictions on each cluster 710, 720 may be used in a comparison to generate a dissimilarity measure since each was generated using the same training data. This technique of distributing model parameters between the clusters 710, 720 has the advantage that, when the training data distributed by the external storage 750 to the clusters 710, 720 is different, it is not necessary to exchange the training data between the clusters 710, 720 to allow comparable prediction values to be determined.

Figure 10:
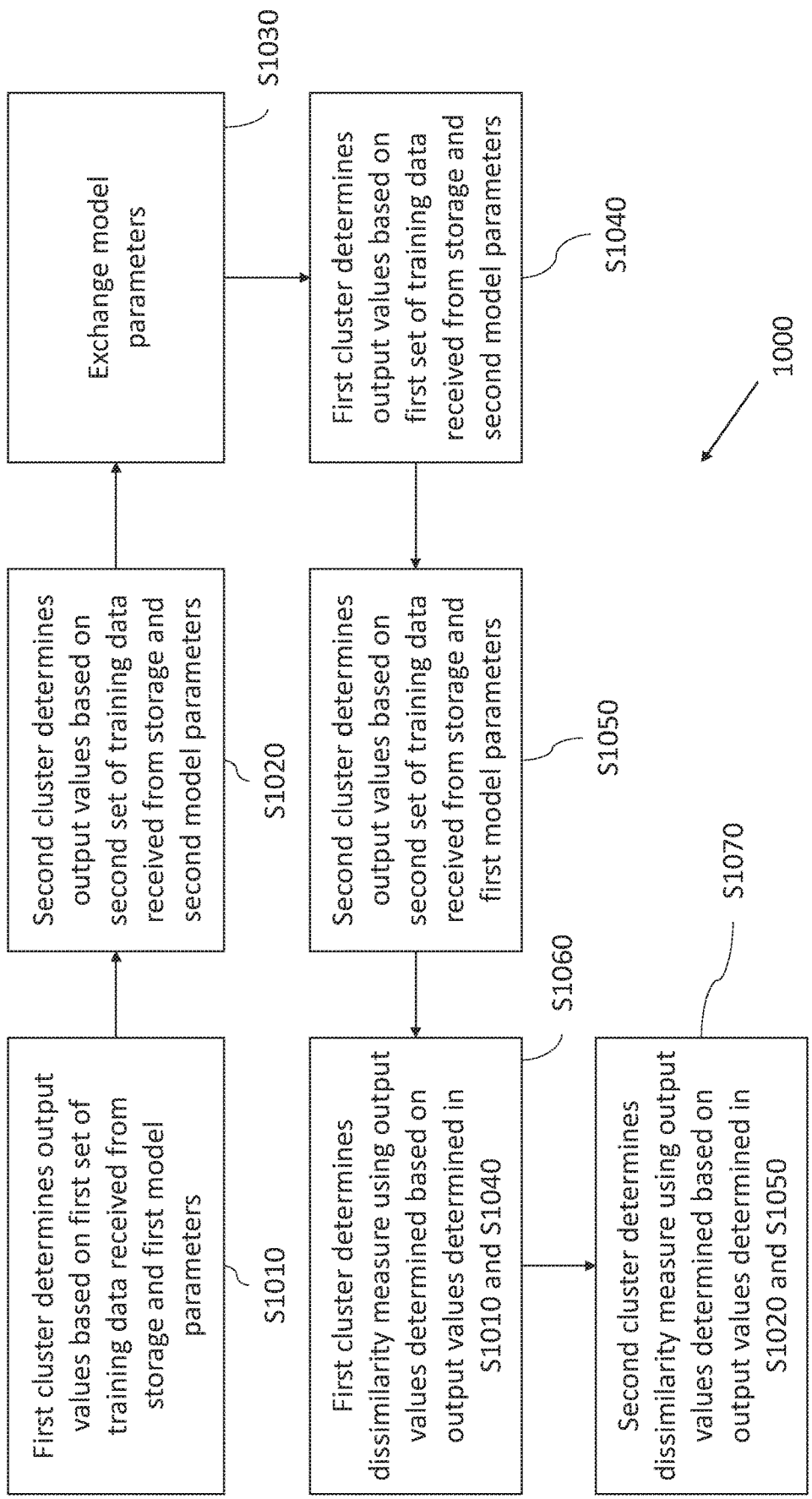
FIG. 10 illustrates an example of a method for determining a measure of dissimilarly by exchanging model parameters.
Figure 11:
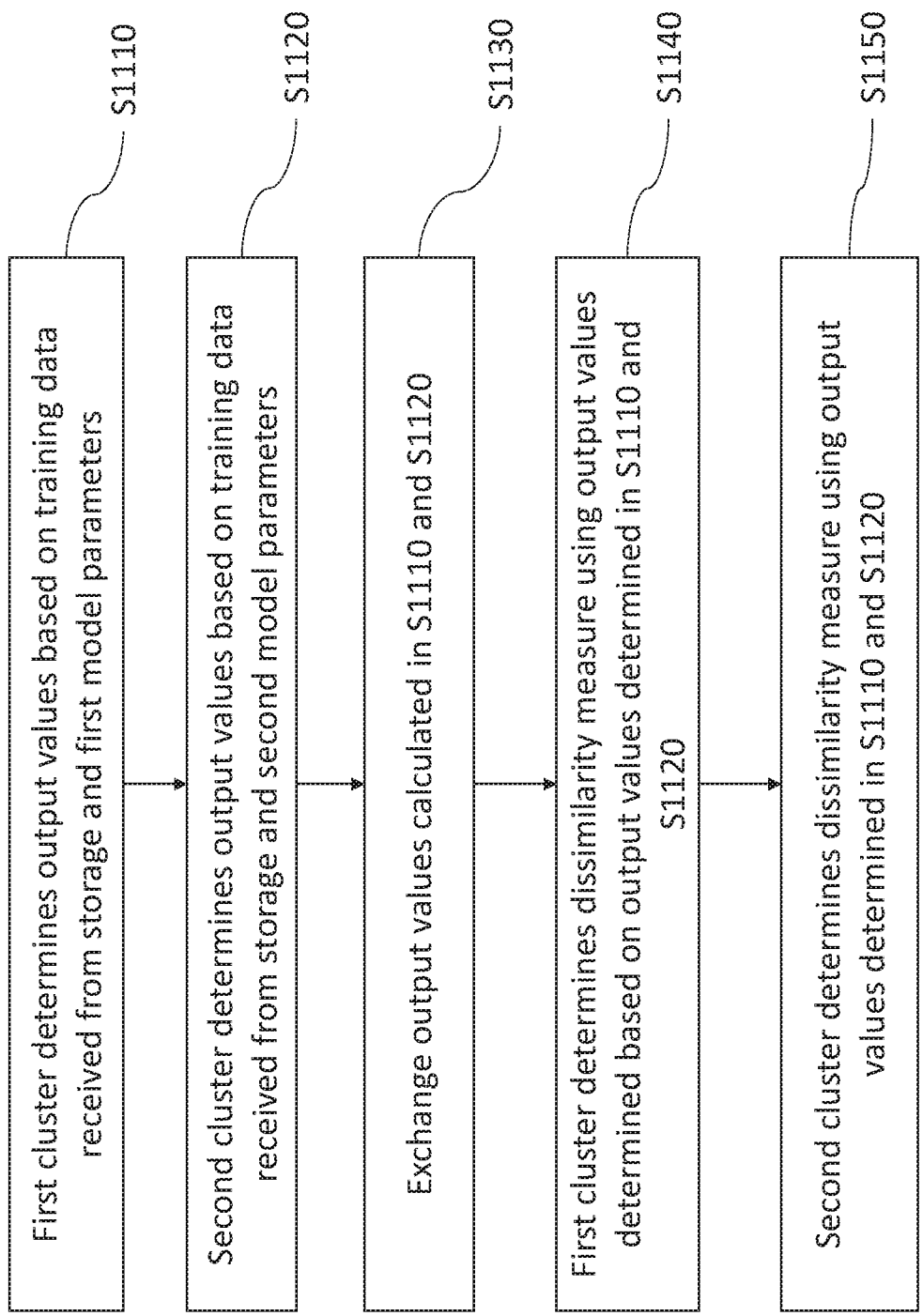
FIG. 11 illustrates an example of a method for determining a measure of dissimilarly by exchanging output values.
Figure 12:
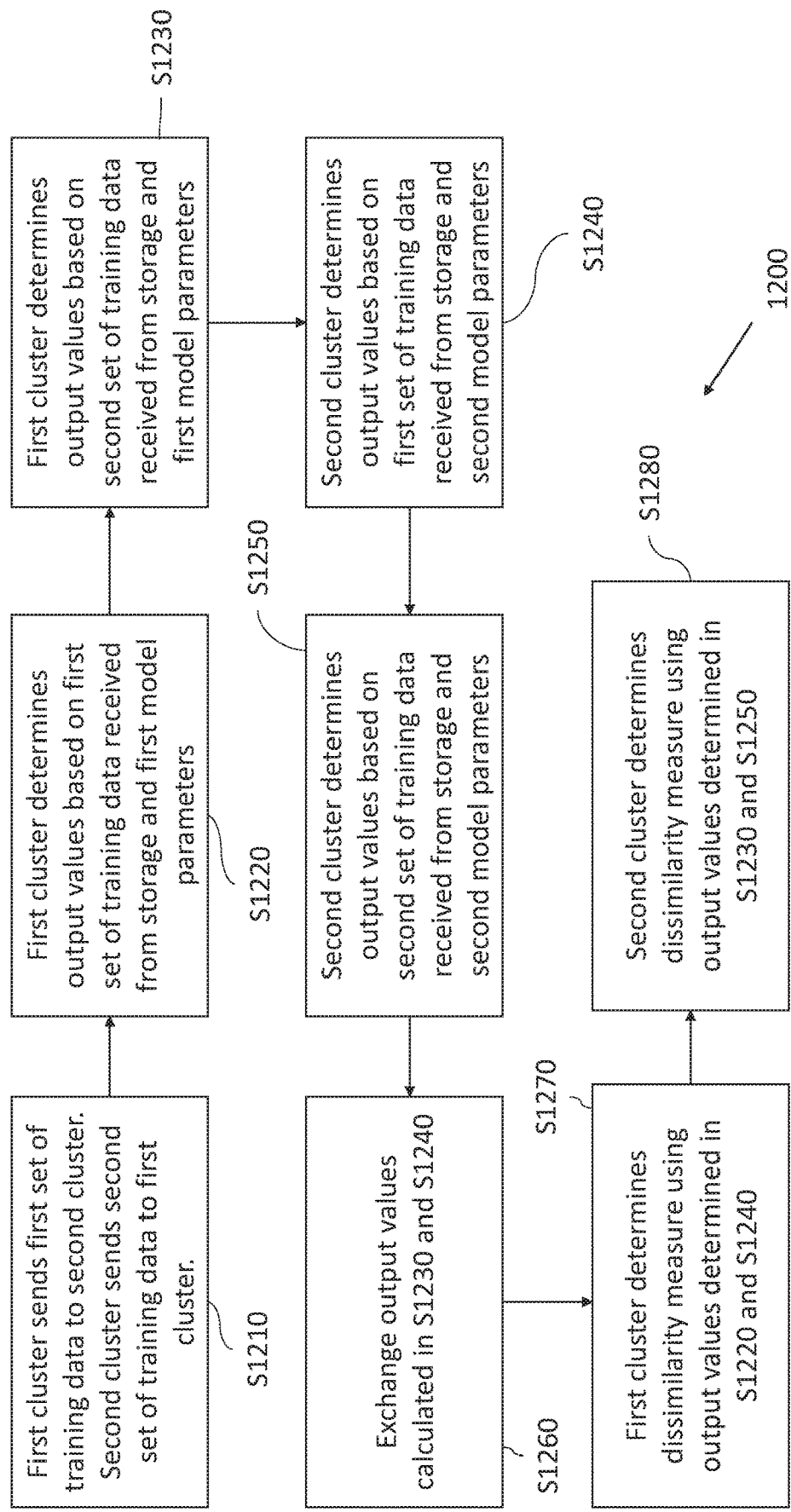
FIG. 12 illustrates an example of a method for determining a measure of dissimilarly by exchanging output values and training data.

These different options for obtaining output values suitable for determining the measure of dissimilarity are described in more detail with respect to FIGS. 10 to 12.

Once each of the clusters 710, 720 has obtained two sets of comparable predictions, each of the clusters 710, 720 then computes a dissimilarity measure, which measures how different the sets of predictions are from one another.

There are different methods that may be applied to calculate the dissimilarity measure between the sets of output values. One approach that works well is the use of the Kullback-Leibler divergence as the dissimilarity measure. The Kullback-Leibler divergence between two different probability distributions, P and Q, is given by:

$$D_{kL}(p\|q) = \sum_x p(x)\log\left(\frac{p(x)}{q(x)}\right) \qquad \text{Equation 3}$$

Therefore, when applying the Kullback-divergence to determine the dissimilarity measure, each of the clusters 710, 720 of processing units determines the measure of dissimilarity as:

$$D_{kL}(p_2\|p_1) = \sum_x p_2(x)\log\left(\frac{p_2(x)}{p_1(x)}\right) \text{ and} \qquad \text{Equation 4a}$$

$$D_{kL}(p_1\|p_2) = \sum_x p_1(x)\log\left(\frac{p_1(x)}{p_2(x)}\right) \qquad \text{Equation 4b}$$

respectively, where $p_1$ is the set of predictions calculated by one of the clusters 710, 720 and $p_2$ is the set of predictions calculated by the other of the clusters 710, 720.

It would be appreciated that whilst Kullback-divergence is one example of a calculation used to determine the dissimilarity measure, other measures of the differences between probability distributions may be applied for that purpose. For example, in some examples, the mean squared error may be used as the dissimilarity measure:

$$MSE = \frac{1}{C}\sum_{x=1}^{C}(p_1(x) - p_2(x))^2 \qquad \text{Equation 4c}$$

where C is the number of predication values output by the neural network.

Although in FIG. 7 only two clusters 710, 720 are shown, the system 700 could comprise more than two clusters, with each of these being configured to exchange output values that are used by each cluster to determine a dissimilarity measure between own output values of its own model and the outputs of each of the other cluster's models in the system 700.

The dissimilarity measure may be referred to herein as the distillation loss. This distillation loss is included as an additional penalty term in the loss function that is calculated by each of the clusters 710, 720 of processing units. The overall loss function calculated by the ith cluster in the system is given by:

$$L^{(i)}(\Theta_k) = L_S(\theta_k^{(i)}) + \xi_k L_D^{(i)}(\Theta_k) \qquad \text{Equation 5}$$

where $\Theta_k$ represents the parameters for the models held by each of the clusters, $\Theta_k = \{\theta_k^{(i)}\}_{i=1}^{N}$ where N is the number of clusters (which is two in the example shown in FIG. 7).

In equation 5, $L_S(\theta_k^{(i)})$ represents the supervised loss calculated by the ith cluster by comparing its output values obtained to the labels for the model. This term is the same as the loss function term shown in Equation 1. In equation 5, $L_D^{(i)}(\Theta_k)$ represents the distillation loss calculated by the ith cluster by comparing its predictions to the predictions of the other cluster/s.

Using the distillation loss to perform distributed training using sets of processing units has advantages when compared to data parallel training in which each set of processing units independently obtains updates to weights, with these updates/updated weights then being shared between the sets of processing units. Specifically, the data parallel training scheme has its limits in that, once a batch size exceeds a certain size, generalisation is observed to degrade. Using the distillation loss to derive the model parameters updates on each set of processing units avoids this limitation.

The distributed training over clusters of processing units can be improved by varying a weighting that is applied to the distillation loss over the training process. This weighting is represented by the parameter $\xi$ in equation 5, which is varied over the training process. The parameter $\xi$ is a hyperparameter since its value is not derived from training. The hyperparameter $\xi_k$ is the value of $\xi$ for the kth training iteration. The value of the hyperparameter is modified over the training period, which has been empirically determined to improve the training process by improving the accuracy of predications made by a neural network that is undergoing training.

Figure 8:
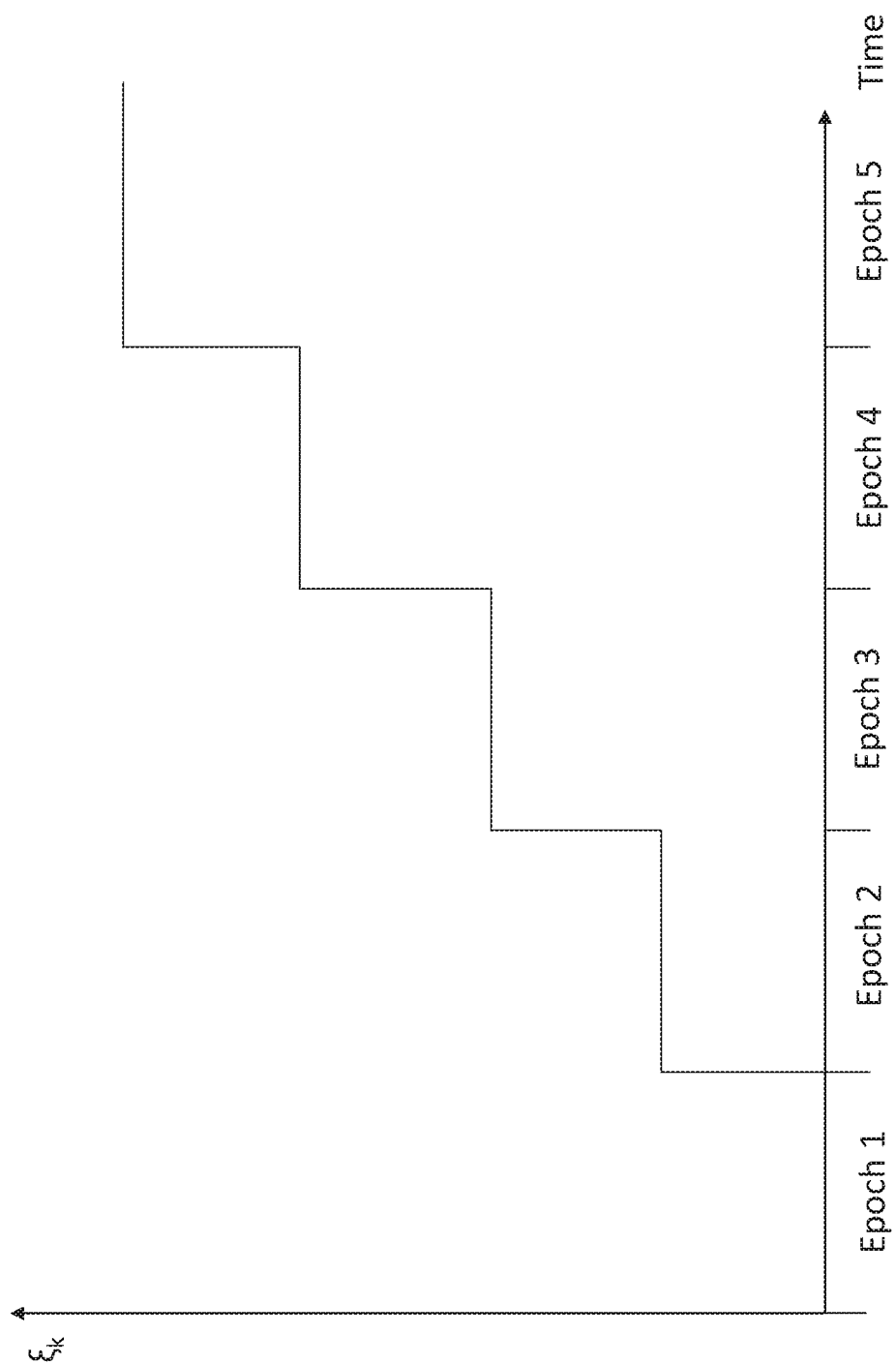
FIG. 8 illustrates an example of how the weighting parameter may vary over the course of the training.

Reference is made to FIG. 8, which illustrates an example of how the hyperparameter $\xi$ may be varied over time. In this example, the hyperparameter is increased as a stepwise function over time. The hyperparameter may be adjusted to take a new value periodically up to maximum of once per iteration of the training process. Although FIG. 8, for simplification, shows only five epochs, in practice the number of epochs is likely to be much larger. The hyperparameter can be any real number.

In one embodiment, the values taken by the hyperparameter are predefined before the training begins. In this case, the values taken by the hyperparameter $\xi$ may be the same or different for each of the clusters 710, 720. The values for the hyperparameter $\xi$ may be stored in the host 740, external storage 750 or in the clusters 710, 720, and then used to adjust the hyperparameter to weight the distillation loss term differently throughout the training process. For example, such predefined values are set such that the hyperparameter $\xi$ gradually increases over the training process representing an increase in the weighting of the distillation loss.

In another embodiment, the values taken by the hyperparameter are calculated by the clusters 710, 720 during the training. In this case, each cluster 710, 720 uses a different value for the hyperparameter and updates the hyperparameter during training using the supervised loss functions and the distillation loss functions calculated by the respective cluster 710, 720 in real time during training.

To show how the values for a hyperparameter may be updated by each cluster 710, 720, consider that an optimum value for $\xi$ is one that minimises the expected loss function. This minimum may be found by setting the gradient of the loss function with respect to the hyperparameter, $\xi$, to be equal to 0:

$$\nabla_\xi L(\Theta_k) = \frac{\partial L(\Theta_k)}{\partial \xi} = 0 \qquad \text{Equation 6}$$

$$= \frac{\partial (L_S(\theta_k) + \xi L_D(\Theta_k))}{\partial \xi}$$

$$= \frac{\partial L_S(\theta_k)}{\partial \xi} + \frac{\partial (\xi L_D(\Theta_k))}{\partial \xi}$$

$$= \frac{\partial L_S(\theta_k)}{\partial \xi} + \xi \frac{\partial (L_D(\Theta_k))}{\partial \xi} + L_D(\Theta_k)$$

$$= \left\langle \frac{\partial L_S(\theta_k)}{\partial \theta}, \frac{\partial \theta_k}{\partial \xi} \right\rangle + \xi \left\langle \frac{\partial L_D(\Theta_k)}{\partial \theta}, \frac{\partial \theta_k}{\partial \xi} \right\rangle + L_D(\Theta_k)$$

$$= \left\langle \nabla_\theta L_S(\theta_k), \frac{\partial \theta_k}{\partial \xi} \right\rangle + \xi \left\langle \nabla_\theta L_D(\Theta_k), \frac{\partial \theta_k}{\partial \xi} \right\rangle + L_D(\Theta_k)$$

$$\left\langle \nabla_\theta L_S(\theta_k) + \xi \nabla_\theta L_D(\Theta_k), \frac{\partial \theta_k}{\partial \xi} \right\rangle + L_D(\Theta_k) = 0$$

In equation 6, the expression $\langle .,. \rangle$ denotes the inner product. To determine the optimum value of the hyperparameter $\xi$ from equation 6, an expression for $$\frac{\partial \theta_k}{\partial \xi}$$

is used. Using the general expression for updating $\theta_k$ via Stochastic Gradient Descent from equation 1, it is seen that:

$$\frac{\partial \theta_k}{\partial \xi} = \frac{\partial (\theta_{k-1} - \eta_{k-1} \nabla_\theta L(\Theta_{k-1}))}{\partial \xi} \qquad \text{Equation 7}$$

$$= \frac{\partial (\theta_{k-1} - \eta_{k-1} \nabla_\theta L_S(\theta_{k-1}) - \eta_{k-1} \xi \nabla_\theta L_D(\Theta_{k-1}))}{\partial \xi}$$

$$= -\eta_{k-1} \nabla_\theta L_D(\Theta_{k-1})$$

By substituting this expression for $$\frac{\partial \theta_k}{\partial \xi}$$

in equation 7 into equation 6, it is seen that:

$$\nabla_\xi L(\Theta_k) = \langle \nabla_\theta L_S(\theta_k) + \xi \nabla_\theta L_D(\Theta_k), \qquad \text{Equation 8}$$

$$-\eta_{k-1} \nabla_\theta L_D(\Theta_{k-1}) \rangle + L_D(\Theta_k)$$

$$= L_D(\Theta_k) - \eta_{k-1} \langle \nabla_\theta L_S(\theta_k) + \xi \nabla_\theta L_D(\Theta_k),$$

$$\nabla_\theta L_D(\Theta_{k-1}) \rangle = 0$$

Re-arranging the expression in Equation 8, allows the hyperparameter $\xi_k$ for the kth training iteration to be expressed as:

$$\xi_k = \frac{L_D(\Theta_k) - \eta_{k-1} \langle \nabla_\theta L_S(\theta_k), \nabla_\theta L_D(\Theta_{k-1}) \rangle}{\eta_{k-1} \langle \nabla_\theta L_D(\Theta_k), \nabla_\theta L_D(\Theta_{k-1}) \rangle} \qquad \text{Equation 9}$$

Therefore, the hyperparameter, $\xi_k$, for a particular training iteration, k, can be calculated as a function of the distillation loss function, the gradients of the loss functions with respect to the model parameters, and the learning rate. Each cluster 710, 720 performs this calculation to determine a new value for the hyperparameter $\xi$ using these values. The distillation loss function is calculated by each cluster 710, 720 using the training data it received from storage 750 to derive predictions using its model and comparing these predictions to predictions made using the model parameters of the model associated with the other cluster 710, 720. The gradients are calculated by each cluster 710, 720 as the gradient of each of the distillation and supervised loss functions with respect to the model parameters for the model associated with the cluster 710, 720.

The learning rate itself may change throughout the training process, with each cluster 710, 720 being configured to, when determining an updated value for the hyperparameter $\xi$, use the learning rate from the previous training iteration to update the hyperparameter $\xi$.

Therefore, each cluster 710, 720 may calculate a new value for the hyperparameter $\xi$ for each of at least some of the training iterations and use the new value to calculate the overall loss function, which is then applied in equation 1 to determine updates to the model parameters. Each cluster 710, 720 calculates a set of updates to the model parameters associated with its own model and uses these updates to update its model.

It may be unnecessary to update the value of the hyperparameter $\xi$ for each and every training iteration, due to the small rate of change for the parameter $\xi$ between the training iterations. Therefore, to reduce the burden placed on the computational resources of the clusters 710, 720, by finding updated values for $\xi$, each of the clusters may be configured to only calculate an updated value for $\xi$ for a predefined portion of the training iterations.

One issue that may arise when calculating an updated value for $\xi$ is that the value calculated is heavily dependent upon the particular training data used for the current training iteration and the preceding training iteration. This, and the fact that model parameters have changed between training iterations, can result in noise in the values that are calculated for $\xi$. This noise is addressed by the system 700 as follows.

Firstly, to smooth out the updates to the hyperparameter $\xi$, a moving average is taken. The moving average is a moving average using the previously calculated values for $\xi$. The moving average used is an exponential moving average. Each cluster 710, 720 applies this moving average when determining an update to the hyperparameter $\xi$.

When applying the moving average, the updated value for the hyperparameter $\xi_{k+1}$ for the k+1th training iteration is given by:

$$\xi_{k+1} = \alpha \xi_k + (1-\alpha) \tilde{\xi}_k \qquad \text{Equation 10}$$

where $\alpha$ is a smoothing coefficient, and $\tilde{\xi}_k$ is a new value that is calculated when determining the updated value for the hyperparameter $\xi_{k+1}$. The new value $\tilde{\xi}_k$ is input into the moving average function applied by the clusters 710, 720, such that the moving average that is determined is taken over the new value $\tilde{\xi}_k$ and the previously calculated values. The previously calculated values are represented by $\xi_k$ in equation 10. The value of $\alpha$ is between 0 and 1, and preferably between 0.9 and 1.

When calculating $\xi_k$, instead of applying equation 9, a different expression is found to yield updated values for the hyperparameter with less noise. Specifically, by determining the value using only values for the gradient based on the data used for the current training iteration, noise resulting from the inner product of gradients from two different mini-batches is avoided. This may be expressed by determining $\xi_k$ as:

$$\hat{\xi}_k = \frac{L_D(\Theta_k) - \eta_{k-1} \langle \nabla_\theta L_s(\theta_k), \nabla_\theta L_D(\Theta_k) \rangle}{\eta_{k-1} \|\nabla_\theta L_D(\Theta_k)\|_2^2 + \epsilon} \quad \text{Equation 11}$$

where $\epsilon$ is a small constant used to prevent division by 0.

Each of the clusters 710, 720 is configured to determine new value $\xi_k$ and use this, along with the previously calculated values for $\xi_k$, as an input into the moving average function. By doing so, the clusters 710, 720, each determine a value for the updated hyperparameter $\xi$ that is less affected by noise.

Figure 9:
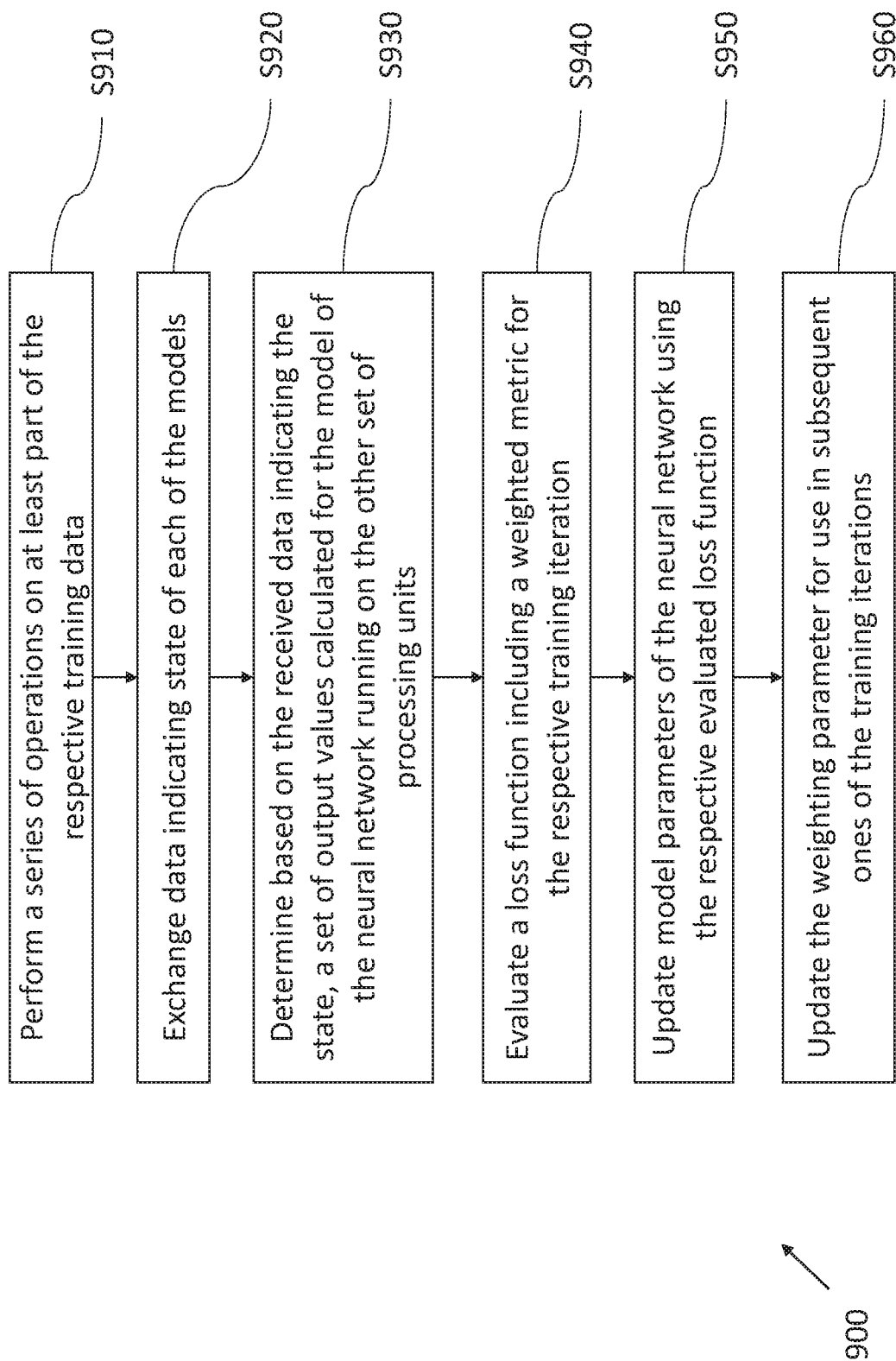
FIG. 9 illustrates an example of a method for training a neural network according to embodiments.

Reference is made to FIG. 9, which illustrates a method 900 according to embodiments of the application.

At S910, each of the sets of processing units performs a series of operations on at least part of the respective training data to derive output values for the neural network.

At S920, the sets of processing units exchange with one another, the data indicating the state of their models.

At S930, the sets of processing units each determine, based on the data indicating the state, a set of output values calculated for the model of the neural network running on the other set of processing units.

At S940, the sets of processing units each evaluate a loss function for the training iteration. The loss function includes the measure of the dissimilarity between the predictions. The measure is weighted by the parameter.

At S950, the set of processing units each updated model parameters of the neural network using their evaluated loss function.

At S960, the sets of processing units update the parameter for use in subsequent ones of the training iterations.

Reference is made to FIG. 10, which illustrates a method 1000 for determining the disimilarity measure using an exchange of model parameters. In this case, the first cluster 710 has received from storage 750 a first set of training data, and the second cluster 720 has received from storage 750 a second set of training data, different to the first.

At S1010, the first cluster 710 determines output values of the neural network based on the first set of training data using the model parameters (first model parameters) of its model.

At S1020, the second cluster 720 determines output values of the neural network based on the second set of training data using the model parameters (second model parameters) of its model.

At S1030, the clusters 710, 720 exchange the first model parameters and the second model parameters.

At S1040, the first cluster 710 determines output values of the neural network based on the first set of training data using the second model parameters.

At S1050, the second cluster 720 determines output values of the neural network based on the second set of training data using the first model parameters.

At S1060, the first cluster 710 determines the dissimilarity measure using the output values calculated in S1010 and S1040.

At S1070, the second cluster 720 determines the dissimilarity measure using the output values calculated in S1020 and S1050.

Reference is made to FIG. 11, which illustrates a method 1100 for determining the disimilarity measure by exchanging the output values obtained from the different models. In this case, the first cluster 710 and the second cluster 720 have received from storage 750, the same set of training data.

At S1110, the first cluster 710 determines the output values using the training data received from storage and the first model parameters.

At S1120, the second cluster 720 determines the output values using the training data received from storage and the second model parameters.

At S1130, the output values are exchanged between the clusters 710, 720. The first cluster 710 sends the output values calculated at S1110 to the second cluster 710, and the second cluster 720 sends the output values calculated at S1120 to the first cluster 710.

At S1140, the first cluster 710 determines the dissimilarity measure using the output values calculated in S1110 and S1120.

At S1150, the second cluster 720 determines the dissimilarity measure using the output values calculated in S1110 and S1120.

Reference is made to FIG. 12, which illustrates a method 1200 for determining the dissimilarity measure by exchanging the training data and output values obtained from the different models. In this case, the first cluster 710 has received from storage 750 a first set of training data, and the second cluster 720 has received from storage 750 a second set of training data, different to the first.

At S1210, the clusters 710, 720 exchange training data. The first cluster 710 sends the first set of training data to the second cluster 720. Likewise, the second cluster 720 sends the second set of training data to the first cluster 710.

At S1220, the first cluster 710 determines the output values using the first set of training data and the first model parameters.

At S1230, the first cluster 710 determines the output values using the second set of training data and the first model parameters.

At S1240, the second cluster 720 determines the output values using the first set of training data and the second model parameters.

At S1250, the second cluster 720 determines the output values using the second set of training data and the second model parameters.

At S1260, output values are exchanged between the clusters 710, 720. The first cluster 710 sends the output values calculated at S1230 to the second cluster 720, and the second cluster 720 sends the output values calculated at S1240 to the first cluster 710.

At S1270, the first cluster 710 determines the dissimilarity measure using the output values it calculated in S1220 and S1240, i.e. those calculated using the first set of training data.

At S1280, the second cluster 720 determines the dissimilarity measure using the output values calculated in S1230 and S1250, i.e. those calculated using the first set of training data.

In addition to the steps of method 1200, the first cluster 710 additionally calculates the supervised loss using the output values calculated at S1220, and the second cluster 720 additionally calculates the supervised loss using the output values calculated at S1250.

It will be appreciated that the above embodiments have been described by way of example only.

The invention claimed is:

1. A data processing system for training a neural network, the data processing system comprising: a first set of one or more processing units, a second set of one or more processing units, at least one data storage, and at least one interconnect between the first set of one or more processing units, the second set of processing units and the at least one data storage,
   wherein the first set of one or more processing units is configured to run a first model of the neural network and the second set of one or more processing units is configured to run a second model of the neural network, the first model and the second model having different sets of model parameters,
   wherein the at least one data storage is configured to provide over the at least one interconnect, training data to the first set of one or more processing units and the second set of one more processing units,
   wherein each of the first and second set of processing units is configured to, for each of at least some of a plurality of training iterations for training the neural network:
      perform a series of operations on at least part of the training data to calculate output values for the model of the neural network running on the respective set of processing units;
      receive over the at least one interconnect, data indicating a state of the model running on the other set of processing units;
      determine based on the received data indicating the state, a set of output values calculated for the model of the neural network running on the other set of processing units;
      update a parameter for use in evaluating a loss function for the respective training iteration;
      evaluate the loss function, said loss function including a measure of dissimilarity between the output values calculated for the model of the neural network running on the respective set of processing units and the determined set of output values for the model of the neural network running on the other set of processing units,
      wherein the measure of dissimilarity is weighted in the evaluation of the loss function in accordance with the parameter; and
      update the set of model parameters of the model running on the respective set of processing units using the respective evaluated loss function;
   wherein the neural network is trained and includes the model running on the respective set of processing units and having the set of model parameters after updating the set of model parameters and subsequent to the plurality of training iterations.

2. A data processing system as claimed in claim 1, wherein the data indicating the state of each of the models running on the other of the sets of processing units comprises the determined set of output values, wherein the step of determining based on the received data indicating the state, the set of output values, comprises extracting those output values from the received data indicating the state.

3. A data processing system as claimed in claim 1, wherein the data indicating the state of each of the models running on the other of the sets of processing units comprises model parameters of the model running on the other of the sets of processing units, wherein the step of determining the set of output values comprises calculating those values using the received model parameters.

4. A data processing system as claimed in claim 1, wherein the training data provided by the at least one data storage over the interconnect comprises a same set of training data provided to the first set of one or more processing units and the second set of one or more processing units.

5. A data processing system as claimed in claim 1, wherein the providing training data to the first set of one or more processing units and the second set of one more processing units comprises providing different sets of training data to the first set of one or more processing units and the second set of one or more processing units.

6. A data processing system as claimed in claim 5, wherein the data indicating the state of each of the models running on the other of the sets of processing units comprises the determined set of output values,
   wherein at least one of the sets of processing units is configured to:
      receive over the at least one interconnect from the other of the set of processing units, at least part of the training data received from the at least one data storage by the other of the sets of processing units; and
      perform the calculating output values for the model of the neural network running on the respective set of processing units using the at least part of the training data received from the other of the set of processing units.

7. A data processing system as claimed in claim 1, wherein each of the first set of one or more processing units and the second set of one or more processing units comprises a cluster of processing units, each of the processing units being formed as part of a separate integrated circuit.

8. A data processing system as claimed in claim 1, wherein the updating of the parameter comprises at least one of the first and second set of processing units receiving an updated value for the parameter.

9. A data processing system as claimed in claim 1, wherein the updating the parameter comprises at least one of the first and second set of processing units updating a value of the parameter to one of a set of values predefined before the training of the neural network.

10. A data processing system as claimed in claim 1, wherein the updating the parameter is performed in dependence upon a learning rate for the neural network.

11. A data processing system as claimed in claim 1, wherein at least one of the first and second set of processing units is configured to calculate the updated parameter in dependence upon values calculated in dependence upon the training data and model parameters used for the respective training iteration.

12. A data processing system as claimed in claim 11, wherein the values calculated in dependence upon the training data comprise an item selected from a list consisting of:
   the loss function;
   one or more gradients of the loss function; and
   a learning rate for a previous training iteration.

13. A data processing system as claimed in claim 11, wherein the calculating the updated parameter comprises calculating the updated parameter in dependence upon a moving average using previously determined parameter values for a plurality of previous training iterations.

14. A data processing system as claimed in claim 13, wherein the moving average is an exponential moving average.

15. A data processing system as claimed in in claim 1, wherein each of the processing units of the first and second sets of processing unit is configured to alternate between operating in:
  a compute phase in which the respective processing unit performs calculations for training the neural network; and
  an exchange phase in which data for training the neural network is exchanged with others of the processing units, said data for training the neural network including the data indicating the state of each of the models,
  wherein the step of exchanging, over the at least one interconnect, the data indicating the state is performed during one of the exchange phases.

16. A data processing system as claimed in in claim 1, wherein the measure of the dissimilarity comprises a Kullback-Leibler divergence between the output values calculated for the model of the neural network running on the respective set of processing units and the determined set of output values for the model of the neural network running on the other set of processing units.

17. A data processing system as claimed in in claim 1, wherein the measure of the dissimilarity comprises a mean squared error between the output values calculated for the model of the neural network running on the respective set of processing units and the determined set of output values for the model of the neural network running on the other set of processing units.

18. A data processing system as claimed in in claim 1, comprising a host system comprising at least one processor configured to:
  interface the first and second set of processing units with the at least one data storage; and
  provide the training data to the first and second set of processing units from the at least one data storage.

19. A method for training a neural network, the method implemented in a data processing system comprising: a first set of processing units, a second set of processing units, data storage, and an interconnect between the first set of processing units, the second set of processing units and the data storage, wherein the first set of processing units is configured to run a first model of the neural network and the second set of processing units is configured to run a second model of the neural network, the first model and the second model having different sets of model parameters, wherein the method comprises:
  calculating first output values for the first model of the neural network from training data;
  calculating second output values for the second model of the neural network from the training data;
  receiving, at the second set of processing units from the first set of processing units, data indicating a state of the first model;
  determining, based on the data indicating the state of the first model, third output values calculated for the first model;
  updating a first parameter for use in evaluating a loss function for a first training iteration;
  evaluating the loss function for the first training iteration, the loss function including a measure of dissimilarity between the second output values and the third output values, wherein the measure of dissimilarity is weighted in the evaluation of the loss function in accordance with the first parameter; and
  updating the set of model parameters of the second model using the loss function;
  wherein the neural network is trained and includes the second model having the set of model parameters after updating the set of model parameters and subsequent to a plurality of training iterations.

20. The method of claim 19, further comprising:
  receiving, at the first set of processing units from the second set of processing units, data indicating a state of the second model;
  determining, based on the data indicating the state of the first model, fourth output values calculated for the second model;
  evaluating an additional loss function for the first training iteration, the additional loss function including a measure of dissimilarity between the first output values and the fourth output values, weighted in accordance with the first parameter; and
  updating model parameters of the first model of the neural network using the additional loss function.

21. The method of claim 19, wherein updating the first parameter is performed in dependence upon a learning rate for the neural network.

22. The method of claim 19, wherein the first set of processing units is configured to update the first parameter in dependence upon the training data and the model parameters.

23. The method of claim 19, wherein updating the first parameter includes calculating the first parameter in dependence upon a moving average using previously determined first parameter values for a plurality of previous training iterations.

24. The method of claim 19, wherein the training data comprises a same set of training data provided to the first set of processing units and the second set of processing units.

25. The method of claim 19, wherein the training data comprises different sets of training data to the first set of processing units and for the second set of processing units.

26. The method of claim 19, further comprising:
  receiving, over the interconnect from the second set of processing units, at least a portion of the training data received by the second sets of processing units; and
  calculating the third output values using the at least a portion of the training data received from the second set of processing units.

27. The method of claim 19, wherein the measure of dissimilarity comprises a Kullback-Leibler divergence between the first output values and the second output values.

28. The method of claim 19, wherein the measure of dissimilarity comprises a mean squared error between the first output values and the second output values calculated by the first set of processing units.

29. The method of claim 19, wherein the first output values are the same as the third output values.

30. A non-transitory computer readable medium comprising a computer program which when executed by a data processing system carries out a method for training a neural network, the method comprising:
  calculating first output values for a first model of the neural network;
  calculating second output values for a second model of the neural network, the first model and the second model having different sets of model parameters;
  determining, based on the model parameters of the first model, third output values calculated for the first model using same training data as used to calculate the second output values;
  update a first parameter for use in evaluating a loss function for a first training iteration; and evaluating the loss function for the first training iteration, the loss function including a measure of dissimilarity between the second output values and the third output values, wherein the measure of dissimilarity is weighted in the evaluation of the loss function in accordance with the first parameter;

updating the set of model parameters of the second model using the loss function;

wherein the neural network is trained and includes the second model having the set of model parameters after updating the set of model parameters and subsequent to a plurality of training iterations.

\* \* \* \* \*